US008429735B2

(12) United States Patent
Ellis

(10) Patent No.: US 8,429,735 B2
(45) Date of Patent: *Apr. 23, 2013

(54) METHOD OF USING ONE OR MORE SECURE PRIVATE NETWORKS TO ACTIVELY CONFIGURE THE HARDWARE OF A COMPUTER OR MICROCHIP

(76) Inventor: Frampton E. Ellis, Jasper, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/398,403

(22) Filed: Feb. 16, 2012

(65) Prior Publication Data

US 2012/0311690 A1 Dec. 6, 2012

Related U.S. Application Data

(63) Continuation-in-part of application No. 13/014,201, filed on Jan. 26, 2011, now abandoned, and a continuation-in-part of application No. 13/016,527, filed on Jan. 28, 2011, now Pat. No. 8,171,537, and a continuation-in-part of application No. PCT/US2011/023028, filed on Jan. 28, 2011, and a continuation-in-part of application No. PCT/US2011/025257, filed on Feb. 17, 2011.

(60) Provisional application No. 61/457,297, filed on Feb. 18, 2011, provisional application No. 61/457,976, filed on Jul. 26, 2011, provisional application No. 61/457,983, filed on Jul. 28, 2011, provisional application No. 61/573,006, filed on Aug. 2, 2011, provisional application No. 61/573,007, filed on Aug. 3, 2011, provisional application No. 61/282,337, filed on Jan. 26, 2010, provisional application No. 61/282,378, filed on Jan. 29, 2010, provisional application No. 61/282,478, filed on Feb. 17, 2010, provisional application No. 61/282,503, filed on Feb. 22, 2010, provisional application No. 61/282,861, filed on Apr. 12, 2010, provisional application No. 61/344,018, filed on May 7, 2010, provisional application No. 61/457,184, filed on Jan. 24, 2011.

(51) Int. Cl.
*G06F 15/173* (2006.01)
*G06F 13/40* (2006.01)
*G06F 17/00* (2006.01)

(52) U.S. Cl.
USPC .................. 726/11; 726/22; 726/30; 713/194

(58) Field of Classification Search .................... 726/11, 726/22, 30; 713/194
See application file for complete search history.

(56) References Cited

U.S. PATENT DOCUMENTS 5,550,984 A 8/1996 Geib
(Continued)

FOREIGN PATENT DOCUMENTS

EP 1 164 766 A2 12/2001
(Continued)

OTHER PUBLICATIONS

Complete file history for U.S. Appl. No. 13/555,750.
(Continued)

*Primary Examiner* — Michael Simitoski
(74) *Attorney, Agent, or Firm* — Finnegan, Henderson, Farabow, Garrett & Dunner, LLP

(57) ABSTRACT

A method for a computer or microchip with one or more inner hardware-based access barriers or firewalls that establish one or more private units disconnected from a public unit or units having connection to the public Internet and one or more of the private units have a connection to one or more non-Internet-connected private networks for private network control of the configuration of the computer or microchip using active hardware configuration, including field programmable gate arrays (FPGA). The hardware-based access barriers include a single out-only bus and/or another in-only bus with a single on/off switch.

40 Claims, 20 Drawing Sheets

U.S. PATENT DOCUMENTS

| | | | |
|---|---|---|---|
| 5,802,320 | A | 9/1998 | Baehr et al. |
| 5,896,499 | A | 4/1999 | McKelvey |
| 6,167,428 | A | 12/2000 | Ellis |
| 6,202,153 | B1 | 3/2001 | Diamant et al. |
| 6,725,250 | B1 | 4/2004 | Ellis |
| 6,732,141 | B2 | 5/2004 | Ellis |
| 7,024,449 | B1 | 4/2006 | Ellis |
| 7,035,906 | B1 | 4/2006 | Ellis |
| 7,047,275 | B1 | 5/2006 | Ellis |
| 7,467,406 | B2 | 12/2008 | Cox et al. |
| 7,506,020 | B2 | 3/2009 | Ellis |
| 7,562,211 | B2 | 7/2009 | Paya et al. |
| 7,606,854 | B2 | 10/2009 | Ellis |
| 7,634,529 | B2 | 12/2009 | Ellis |
| 7,805,756 | B2 | 9/2010 | Ellis |
| 7,814,233 | B2 | 10/2010 | Ellis |
| 7,840,997 | B2 | 11/2010 | Shevchenko |
| 7,908,650 | B2 | 3/2011 | Ellis |
| 7,926,097 | B2 | 4/2011 | Ellis |
| 7,984,301 | B2 | 7/2011 | Kaabouch et al. |
| 8,010,789 | B2 | 8/2011 | Witchey |
| 8,171,537 | B2 | 5/2012 | Ellis |
| 8,255,986 | B2 | 8/2012 | Ellis |
| 2001/0054159 | A1 | 12/2001 | Hishino |
| 2004/0073603 | A1 | 4/2004 | Ellis |
| 2004/0098621 | A1 | 5/2004 | Raymond |
| 2004/0158744 | A1 | 8/2004 | Deng et al. |
| 2004/0162992 | A1 | 8/2004 | Sami et al. |
| 2004/0215931 | A1 | 10/2004 | Ellis |
| 2006/0095497 | A1 | 5/2006 | Ellis |
| 2006/0177226 | A1 | 8/2006 | Ellis |
| 2006/0190565 | A1 | 8/2006 | Ellis |
| 2007/0162974 | A1 | 7/2007 | Speidel |
| 2007/0300305 | A1 | 12/2007 | Gonsalves et al. |
| 2008/0134290 | A1 | 6/2008 | Olsson |
| 2009/0031412 | A1 | 1/2009 | Ellis |
| 2009/0200661 | A1 | 8/2009 | Ellis |
| 2009/0254986 | A1 | 10/2009 | Harris et al. |
| 2009/0282092 | A1 | 11/2009 | Ellis |
| 2010/0011083 | A1 | 1/2010 | Ellis |
| 2011/0004930 | A1 | 1/2011 | Ellis |
| 2011/0004931 | A1 | 1/2011 | Ellis |
| 2011/0225645 | A1 | 9/2011 | Ellis |

FOREIGN PATENT DOCUMENTS

| | | | |
|---|---|---|---|
| WO | WO 2011/094616 | A1 | 8/2011 |
| WO | WO2011103299 | A1 | 8/2011 |

OTHER PUBLICATIONS

Notification of Transmittal of International Search Report and Written Opinion of the International Searching Authority, or the Declaration, from International Searching Authority, mailed May 4, 2012, regarding International Application No. PCT/US2012/025481 (11 pages).

Famatech, Redmin v3.0, User Manual, 2007.

Connect One. "iChip CO2064/CO2144 Data Sheet Ver. 1.20", 2011.

Shao, Fengjing et al., "A New Secure Architecture of Network computer Based on Single CPU and Dual Bus", Fifth IEEE International Symposium on Embedded Computing, 2008.

Wang, Tiedong et al. "A Hardware Implement of bus Bridge Based on single CPU and Dual Bus", 2008 International Symposium on computer Science and Computational Technology, 2008.

Complete file history for U.S. Appl. No. 13/014,201.

Complete file history for U.S. Appl. No. 13/016,527.

Complete file history for U.S. Appl. No. 13/328,697.

Updated file history for U.S. Appl. No. 13/555,750.

METHOD OF USING ONE OR MORE SECURE PRIVATE NETWORKS TO ACTIVELY CONFIGURE THE HARDWARE OF A COMPUTER OR MICROCHIP

Applicant claims the right to priority based on U.S. Provisional Patent Application 61/457,184, filed Jan. 24, 2011; U.S. Provisional Patent Application No. 61/457,297, filed Feb. 18, 2011; U.S. Provisional Patent Application No. 61/457,976, filed Jul. 26, 2011; U.S. Provisional Patent Application No. 61/457,983, filed Jul. 28, 2011; U.S. Provisional Patent Application No. 61/573,006, filed Aug. 2, 2011; and U.S. Provisional Patent Application No. 61/573,007, filed Aug. 3, 2011.

This application is also a continuation-in-part of U.S. application Ser. No. 13/014,201, filed Jan. 26, 2011 now abandoned. U.S. application Ser. No. 13/014,201 claims benefit to U.S. Provisional Patent Application No. 61/282,337 filed Jan. 26, 2010; U.S. Provisional Patent Application No. 61/282,378, filed Jan. 29, 2010; U.S. Provisional Patent Application No. 61/282,478, filed Feb. 17, 2010; U.S. Provisional Patent Application No. 61/282,503, filed Feb. 22, 2010; U.S. Provisional Patent Application No. 61/282,861, filed Apr. 12, 2010; U.S. Provisional Patent Application No. 61/344,018, filed May 7, 2010; and U.S. Provisional Patent Application No. 61/457,184, filed Jan. 24, 2011.

This application is also a continuation-in-part of U.S. application Ser. No. 13/016,527 filed Jan. 28, 2011 now U.S. Pat. No. 8,171,537. U.S. application Ser. No. 13/016,527 claims benefit to U.S. Provisional Patent Application No. 61/282,378, filed Jan. 29, 2010; U.S. Provisional Patent Application No. 61/282,478, filed Feb. 17, 2010; U.S. Provisional Patent Application No. 61/282,503, filed Feb. 22, 2010; U.S. Provisional Patent Application No. 61/282,861, filed Apr. 12, 2010; U.S. Provisional Patent Application No. 61/344,018, filed May 7, 2010; and U.S. Provisional Patent Application No. 61/457,184, filed Jan. 24, 2011.

This application is also a continuation-in-part of PCT Application No. PCT/US011/023028, filed Jan. 28, 2011. PCT Application No. PCT/US011/023028 claims benefit to U.S. Provisional Patent Application No. 61/282,378, filed Jan. 29, 2010; U.S. Provisional Patent Application No. 61/282,478, filed Feb. 17, 2010; U.S. Provisional Patent Application No. 61/282,503, filed Feb. 22, 2010; U.S. Provisional Patent Application No. 61/282,861, filed Apr. 12, 2010; U.S. Provisional Patent Application No. 61/344,018, filed May 7, 2010; and U.S. Provisional Patent Application No. 61/457,184, filed Jan. 24, 2011. PCT Application No. PCT/US011/023028 also claims benefit to U.S. application Ser. No. 13/014,201, filed Jan. 26, 2011.

This application is also a continuation-in-part of PCT Application No. PCT/US011/025257, filed Feb. 17, 2011. PCT Application No. PCT/US011/025257 claims the right to priority based on U.S. Provisional Patent Application No. 61/282,478, filed Feb. 17, 2010; U.S. Provisional Patent Application No. 61/282,503, filed Feb. 22, 2010; U.S. Provisional Patent Application No. 61/282,861, filed Apr. 12, 2010; U.S. Provisional Patent Application No. 61/344,018, filed May 7, 2010; and U.S. Provisional Patent Application No. 61/457,184, filed Jan. 24, 2011. PCT Application No. PCT/US011/025257 also claims the right to priority based on U.S. Nonprovisional patent application Ser. No. 13/014,201, filed Jan. 26, 2011, and U.S. Nonprovisional patent application Ser. No. 13/016,527, filed Jan. 28, 2011.

The contents of all of these provisional and nonprovisional patent applications are hereby incorporated by reference in their entirety.

BACKGROUND

This invention relates to any computer of any form, such as a personal computer and/or microchip, that has an inner hardware-based access barrier or firewall that establishes a private unit that is disconnected from a public unit, the public unit being configured for a connection to a public network of computers including the Internet. In addition, the computer's private unit is configured for a separate connection to at least one non-Internet-connected private network for administration, management, and/or control of the computer and/or microchip, locally or remotely, by either a personal user or a business or corporate entity.

More particularly, this invention relates to a computer and/or microchip with an inner hardware-based access barrier or firewall separating the private unit that is not connected to the Internet from a public unit connected to the Internet, the private and public units being connected only by a hardware-based access barrier or firewall in the form of a secure, out-only bus or equivalent wireless connection. Even more particularly, this invention relates to the private and public units also being connected by an in-only bus (or equivalent wireless connection) that includes a hardware input on/off switch or equivalent signal interruption mechanism, including an equivalent circuit on a microchip or nanochip (or equivalent wireless connection). Still more particularly, this invention relates to the private and public units being connected by an output on/off switch or microcircuit or nanocircuit equivalent on the secure, out-only bus (or equivalent wireless connection).

In addition, this invention relates to a computer and/or microchip that is connected to a another computer and/or microchip, the connection between computers being made with the same hardware-based access barriers or firewalls including potentially any of the buses and on/off switches described in the preceding paragraph.

Finally, this invention relates to a computer and/or microchip with hardware-based access barriers or firewalls used successively between an outer private unit, an intermediate more private unit, an inner most private unit, and the public unit (or units), with each private unit potentially being configured for a connection to a separate private network. Also, Faraday Cage protection from external electromagnetic pulses for part or all of the computer and/or microchip can be provided.

By way of background, connecting computers to the Internet has immense and well known benefits today, but also has created overwhelming security problems that were not imagined when the basic architecture of modern electronic computers was developed in 1945, which was about twenty years before networks came into use. Even then, those first networks involved a very limited number of connected computers, had low transmission speeds between them, and the network users were generally known to each other, since most networks were relatively small and local.

In contrast, the number of computers connected to the Internet today is greater by a factor of many millions, broadband connection speeds are faster by a similar magnitude, the network connections stretch worldwide and connect to hundreds of thousands of bad actors whose identity is not easily or quickly known, if ever. Indeed, the Internet of today allows the most capable criminal hackers direct access to any computer connected to the Internet. This inescapable reality of the Internet has created a huge and growing threat to military and economic security worldwide. At the same time, connection to the Internet has become the communication foundation upon which both the global economy and individual users depend every day.

In summary, then, computer connection to the Internet is mandatory in today's world, so disconnection is not a feasible option, given the existing global dependence on the Internet. But those unavoidable connections have created a seemingly inherent and therefore unsolvable security problem so serious that it literally threatens the world. So Internet connection today is both unavoidable and unavoidably unsafe.

Past efforts to provide Internet security have been based primarily on conventional firewalls that are positioned externally, physically and/or functionally, between the computer and an external network like the Internet. Such conventional firewalls provide a screening or filtering function that attempts to identify and block incoming network malware. But because of their functionally external position, conventional firewalls must allow entry to a significant amount of incoming traffic, so either they perform their screening function perfectly, which is an impossibility, or at least some malware unavoidably gets into the computer and just a single instance of malware can cause a crash or worse. Once the malware is in, the von Neumann architecture of current computers provides only software protection, which is inherently vulnerable to malware attack, so existing computers are essentially indefensible from successful attack from the Internet, which has provided an easy, inexpensive, anonymous, and effective means for the worst of all hackers worldwide to access any computer connected to it.

SUMMARY

Therefore, computers cannot be successful defended without inner hardware or firmware-based access barriers or firewalls that, because of their internal position, can be designed much more simply to function as a access barrier or blockers rather than as general filters. This is a distinct difference. An Internet filter has to screen any network traffic originating from anywhere in the entire Internet, which is without measure in practical terms and is constantly, rapidly changing, an incredibly difficult if not impossible screening task. In contrast, an access barrier or blocker to an inner protected area of a computer can strictly limit access to only an exception basis. So, in simple terms, a conventional firewall generally grants access to all Internet traffic unless it can be identified as being on the most current huge list of ever changing malware; in contrast, an inner access barrier or blocker can simply deny access to all network traffic, with the only exception being a carefully selected and very short and conditioned list of approved and authenticated sources or types of traffic to which access is not denied.

Such a massively simpler and achievable access blocking function allowing for a much simpler and efficient mechanism for providing reliable security. Whereas a conventional but imperfect firewall requires extremely complicated hardware with millions of switches and/or firmware and/or software with millions of bits of code, the hardware-based access barriers described in this application require as little as a single simple one-way bus and/or another simple one-way bus with just a single switch and/or both simple buses, each with just a single switch. This extraordinarily tiny amount of hardware is at the absolute theoretical limit and cannot be less.

With this new and unique access denial approach, a computer and/or microchip can be simply and effectively defended from Internet malware attack with one or more hardware-based private, protected units (or zones or compartments) inside the computer. Similar to Java Sandboxes in terms of overall function, but far more effective because hardware-based. Any or all of these private units can be administrated, managed, and/or controlled by a personal or corporate computer user through the use of one or more separate and more secure non-Internet private networks. By thus avoiding any connection whatsoever to the generally insecure public Internet, connection of the computer's private unit to the secure private network allows for all the well known speed, efficiency and cost effectiveness of network connection while still completely avoiding the incalculable risk of Internet connection.

Volatile memory like Flash that is read/write can function as inexpensive read-only memory (ROM) when located in the Private Unit(s) because can be protected by an access barrier or firewall against writing. Furthermore, it can even be protected against unauthorized reading, unlike ROM. Finally, it can be written to when authorized by the central controller to update an operating system or download an app, for example, again unlike ROM.

In addition, field programmable gate arrays can be used in the private and public units, as well as in the access barriers or firewalls, and can be securely controlled by the computer or microchip central controller through the secure control bus to actively change security and other configurations, thus providing for the first time a dynamic and proactive hardware defense against Internet malware attacks.

This application hereby expressly incorporates by reference in its entirety U.S. patent application Ser. No. 10/684,657 filed Oct. 15, 2003 and published as Pub. No. US 2005/0180095 A1 on Aug. 18, 2005 and U.S. patent application Ser. No. 12/292,769 filed Nov. 25, 2008 and published as Pub. No. US 2009/0200661 A1 on Aug. 13, 2009.

Also, this application hereby expressly incorporates by reference in its entirety U.S. patent application Ser. No. 10/802,049 filed Mar. 17, 2004 and published as Pub. No. US 2004/0215931 A1 on Oct. 28, 2004; U.S. patent application Ser. No. 12/292,553 filed Nov. 20, 2008 and published as Pub. No. US 2009/0168329 A1 on Jul. 2, 2009; and U.S. patent application Ser. No. 12/292,769 filed Nov. 25, 2008 and published as Pub. No. US 2009/0200661 A1 on Aug. 13, 2009.

Finally, this application hereby expressly incorporates by reference in its entirety U.S. Pat. No. 6,167,428 issued 26 Dec. 2000, U.S. Pat. No. 6,725,250 issued 20 Apr. 2004, U.S. Pat. No. 6,732,141 issued 4 May 2004, U.S. Pat. No. 7,024,449 issued 4 Apr. 2006, U.S. Pat. No. 7,035,906 issued 25 Apr. 2006, U.S. Pat. No. 7,047,275 issued 16 May 2006, U.S. Pat. No. 7,506,020 issued 17 Mar. 2009, U.S. Pat. No. 7,606,854 issued 20 Oct. 2009, U.S. Pat. No. 7,634,529 issued 15 Dec. 2009, U.S. Pat. No. 7,805,756 issued 28 Sep. 2010, and U.S. Pat. No. 7,814,233 issued 12 Oct. 2010.

Definitions and reference numerals are the same in this application as in the above incorporated '657, '769, '049 and '553 U.S. Applications, as well as in the above incorporated '428, '250, '141, '449, '906, '275, '020, '854, '529, '756, and '233 U.S. patents.

BRIEF DESCRIPTION OF THE DRAWINGS

FIG. 1 also shows an example embodiment of the Private Unit 53 having at least one separate connection to at least one separate, more secure non-Internet-connected private network 52 for personal or local administration of a computer such as the personal computer 1 and/or microchip 90 (and/or 501) and/or silicon wafer 1500 (or portion 1501, 1502, and/or 1503), or graphene equivalent. The number and placement of the non-Internet-connected networks 52 and the use of active configuration of the connection is optional.

DETAILED DESCRIPTION OF EXAMPLE EMBODIMENTS

Figure 1:
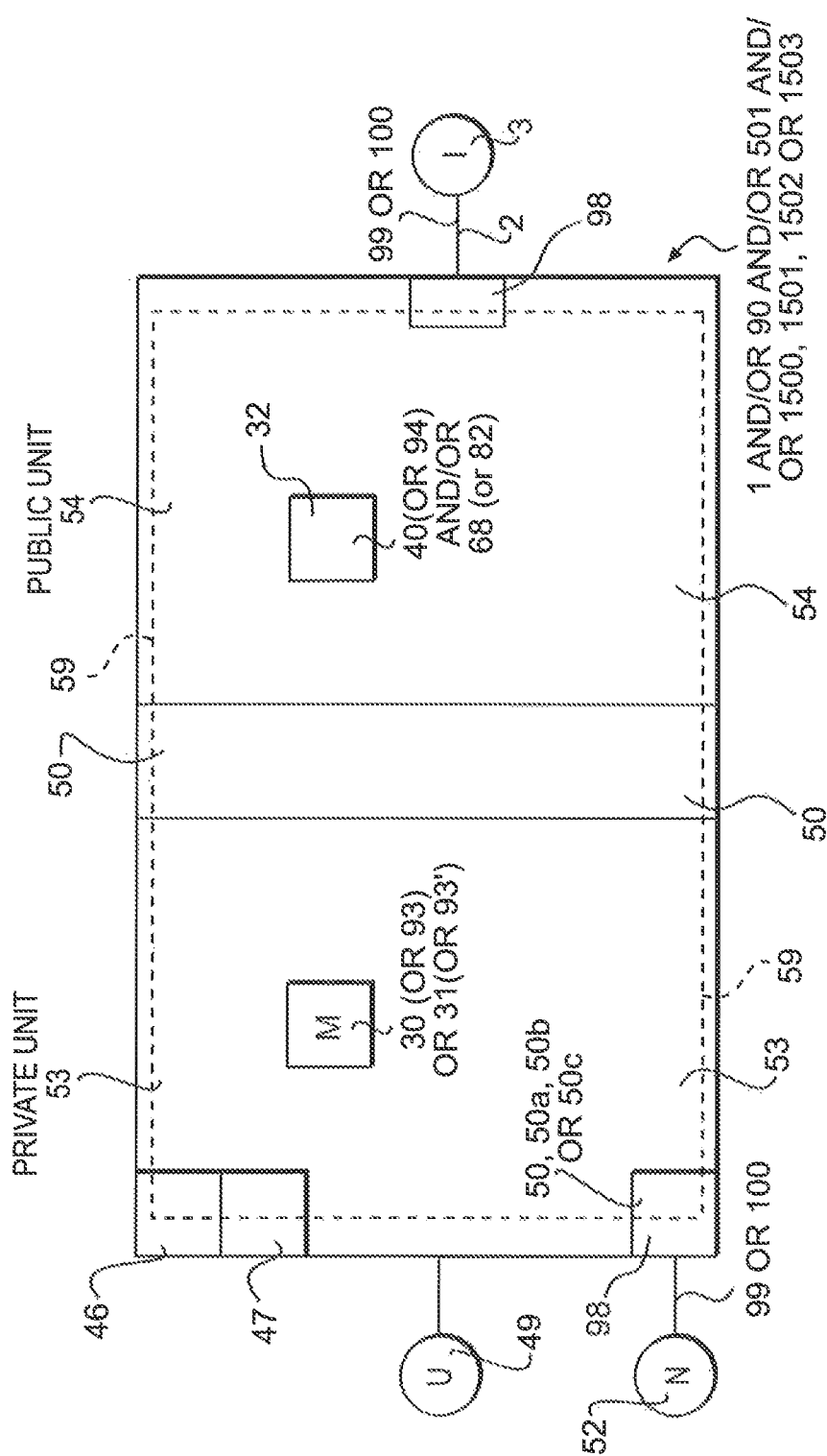
FIG. 1 shows any computer of any type or size or design, such as a personal computer 1 and/or microchip 90 (and/or 501) or nanochip with an inner hardware-based access barrier or firewall 50 establishing a Private Unit (or zone or compartment) 53 of the computer or microchip that is disconnected from a Public Unit (or zone or compartment) 54 that is connected to the generally insecure public Internet 3 (and/or another, intermediate network 2 that is connected to the Internet 3).

FIGS. 1-4, 6, 8-14 all show useful architectural example embodiments of any computer or microchip, including a personal computer 1 and/or microchip 90 (and/or 501) or silicon wafer (or graphene equivalent) 1500 (wafer or wafer portion 1501, 1502, and/or 1503, as described in FIGS. 19-26 and associated text of the '553 Application, which are incorporated by reference herein); tablets, smartphones, servers (including blades) and cloud or supercomputer arrays are other well known examples of computers. The computer shown has an inner hardware-based access barrier or firewall 50 establishing a secure Private Unit (or zone or compartment) 53 that is directly controlled by a user 49 (local in this example) and disconnected by hardware-based access barrier or firewall 50 from a Public Unit (or zone or compartment) 54 that is connected to the open, public and generally insecure Internet 3 and/or another, intermediate network 2; the connection of the computer 1 (and/or 90 and/or 501 and/or 1500 or 1501, 1502, or 1503) to the network 2 and/or Internet 3 can be wired 99 or wireless 100.

Hardware-based access barrier or firewall 50 (or 50a, 50b, or 50c) as used in this application refers to an access barrier that includes one or more access barrier or firewall-specific hardware and/or firmware components. This hardware and/or firmware configuration is in contrast to, for example, a computer firewall common in the art that includes only software and general purpose hardware, such as an example limited to firewall-specific software running on the single general purpose microprocessor or CPU of a computer.

The Internet-disconnected Private Unit 53 includes a master controlling device (M or CC) 30 for the computer PC1 (and/or a master controller unit 93 for the microchip 90 and/or 501) that can include a microprocessor or processing unit and thereby take the form of a general purpose microprocessor or CPU, for one useful example, or alternatively only control the computer as a master controller 31 or master controller unit 93' (with relatively little or no general purpose processing power compared to the processing units or cores of the computer or microchip being controlled). The user 49 controls the master controlling device 30 (or 31 or 93 or 93') located in the Private Unit 53 and controls both the Private Unit 53 at all times and any part or all of the Public Unit 54 selectively, but can peremptorily control any and all parts of the Public Unit 54 at the discretion of the user 49 through active intervention or selection from a range of settings, or based on standard control settings by default, using for example a secure control bus 48 (to be discussed later). The Public Unit 54 typically can include one or more cores or general purpose microprocessors 40 or 94 and/or graphics-based microprocessors 68 or 82 that are designed for more general operations and not limited to graphics-related operations, including very large numbers of either or both types of microprocessors, and potentially including one or more secondary controllers 32, as well as any number of specialized or single-function microprocessors.

The inner hardware-based access barrier or firewall has the capability of denying access to said protected portion of the computer 1 or microchip 90 by a generally insecure public network including the Internet, while permitting access by any other computer in the public network including the Internet to said one or more of the processing units included in the unprotected portion of the computer 1 or microchip 90 for an operation with said any other computer in the public network including the Internet when the computer is connected to the public network including the Internet. The operation can be any computer operation whatsoever involving some interaction between two computers including simply sending and/or receiving data and also including, but not limited to, specific examples such as searching, browsing, downloading, streaming, parallel processing, emailing, messaging, file transferring or sharing, telephoning or conferencing.

More particularly, FIG. 1 shows a useful example of an optional (one or more) private network 52, which is more secure by being, for example, closed and disconnected from the Internet 3 (permanently or temporarily) and/or by having controlled access, to be used for administration and/or management and/or control of the Private Unit 53, including for example by a business enterprise. Wired 99 connection directly to the Private Unit 53 offers superior security generally for the closed and secure private network 52, but wireless 100 connection is a option, especially if used with a sufficiently high level of encryption and/or other security measures, including low power radio signals of high frequency and short range and/or directional, as well as frequency shifting and other known wireless security measures. Access from the private non-Internet-connected network 52 can be limited to only a part of the Private Unit 53 or to multiple parts or to all of the Private Unit 53.

FIG. 1 shows a computer 1 and/or microchip 90 (and/or 501 and/or 1500, 1501, 1502, or 1503) with the at least one Public Unit 54 and the at least one Private Unit 53. The at least one Public Unit 54 is configured for connection to the Internet 3, either directly or through at least one intermediate network 2. The at least one Private Unit 53 is disconnected from the networks 2 and 3 by the access barrier/firewall 50 and is connected to only a private network 52 from a network connection location in the Private Unit 53. The Public Unit 54 is connected to network 2 and/or 3 from a separate network connection location in the Public Unit 54. Separate and distinct network connection components 98 for separate wired 99 and/or wireless 100 network connections are shown at the at least two separate and distinct network connection locations, one location in the Private Unit (or units) 53 and the other location in Public Unit 54 indicated in FIG. 1 and FIGS. 2-11, 12-14 and 18.

Such a one or more private non-Internet-connected network 52 (not connected to the open and insecure public Internet 3 either directly or indirectly, such as through another, intermediate network like an Intranet 2) can allow specifically for use as a highly secure and closed private network for providing administrative or management or control functions like testing, maintenance, trouble-shooting, synchronizing files, modifying security, or operating or application system updates to the Private Units 53 of any computers (PC1 or microchip 90 or 501) with one or more Public Units 54 that are connected to a less secure local network 2, such as a business or home network, that is connected to the public Internet 3.

A particularly useful business example would be administering large numbers of local employee personal computers or network servers, and also including large arrays (especially blades) for cloud applications or supercomputer arrays with a vast multitude of microprocessors or local clusters; in the latter examples, it is possible for a centralized operator to use the private network 52 to control, securely and directly, the master controlling devices 30 or 31 or master controller unit 93 or 93' and associated memory or other devices in the Private Units 53 of a multitude of servers, blades, or large arrays or clusters of computers that are connected to the Internet 3. A personal use example would be to use a private network 52 to connect the private unit 53 of a personal user's smartphone to the private unit 53 of the user's computer laptop in order to update and/or synchronize data or code between the two private units 53. To maximize security, some or all network 52 traffic can be encrypted and/or authenticated, especially if wireless 100, including with a very high level of encryption.

In addition, in another useful example, a computer (PC1 and/or 90 and/or 501) can be configured so that the private non-Internet-connected network 52 can have the capability to allow for direct operational control of the Private Unit 53, and thus the entire computer, from any location (including a remote one), which can be useful for example for businesses operating an array of servers like blades to host cloud operations or supercomputers with large numbers of microprocessors or cores.

One or more access barriers or firewalls 50a, 50b, or 50c can be located between the secure private non-Internet-connected network 52 and the Private Unit 53, providing a useful example of increased security that can be controlled using the private network 52.

In yet another useful example, a personal user 49 can dock his smartphone (PC1 and/or 90 and/or 501 and/or 1500, 1501, 1502, or 1503) linking through wire or wirelessly to his laptop or desktop computer (PC1 and/or 90 and/or 501 and/or 1500, 1501, 1502, or 1503) in a network 52 connection to synchronize the Private Units 53 of those two (or more) personal computers or perform other shared operations between the Private Units 53. In addition, the Public Units 54 of the user's multiple personal computers can be synchronized simultaneously during the same tethering process, or perform other shared operations between the Public Units 54. Other shared operations can be performed by the two or more linked computers of the user 49 utilizing, for example, two or three or more Private Units 53, each unit with one or more private non-Internet connected networks 52, while two or more Public Units 54 can perform shared operations using one or more other networks 2, including the open and insecure Internet 3, as shown later in FIG. 6.

Also shown in FIG. 1 for personal computer PC1 embodiments is an optional removable memory 47 located in the Private Unit 53; the removable memory 47 can be of any form or type or number using any form of one or more direct connections to the Private Unit 53; a thumbdrive or SD card are typical examples, connected to USB, Firewire, SD, or other ports located in the Private Unit 53 (or other ports or card slots of any form), which can also be used for the physical connection to the private network 52. FIG. 1 shows as well an optional one or more removable keys 46, of which an access key, an ID authentication key, or an encryption and/or decryption key are examples, also connected to the Private Unit 53 using any form of connection, including the above examples; both 46 and 47 can potentially be isolated from other parts of the Private Unit 53 by access barrier(s) or firewall(s) 50, 50a, 50b, and/or 50c, which can use active configuration such as field programmable gate array(s) 59.

For microchip 90 (and/or 501) embodiments, wireless connection is a feasible option to enable one or more removable memories 47 or one or more removable keys 46 (or combination of both), particularly for ID authentication and/or access control, utilizing the same ports described above. In addition, all or part of the Private Unit 53 of a computer PC1 and/or microchip 90 and/or 501 (or wafer 1500, 1501, 1502, or 1501) can be removable from the remaining portion of the same computer PC1 and/or microchip 90 and/or 501, including the Public Unit 54; the access control barrier or firewall 50 (or 50*a* and/or 50*b* and/or 50*c*) can be removable with the Private Unit 53 or remain with Public Unit 54.

Figure 4:
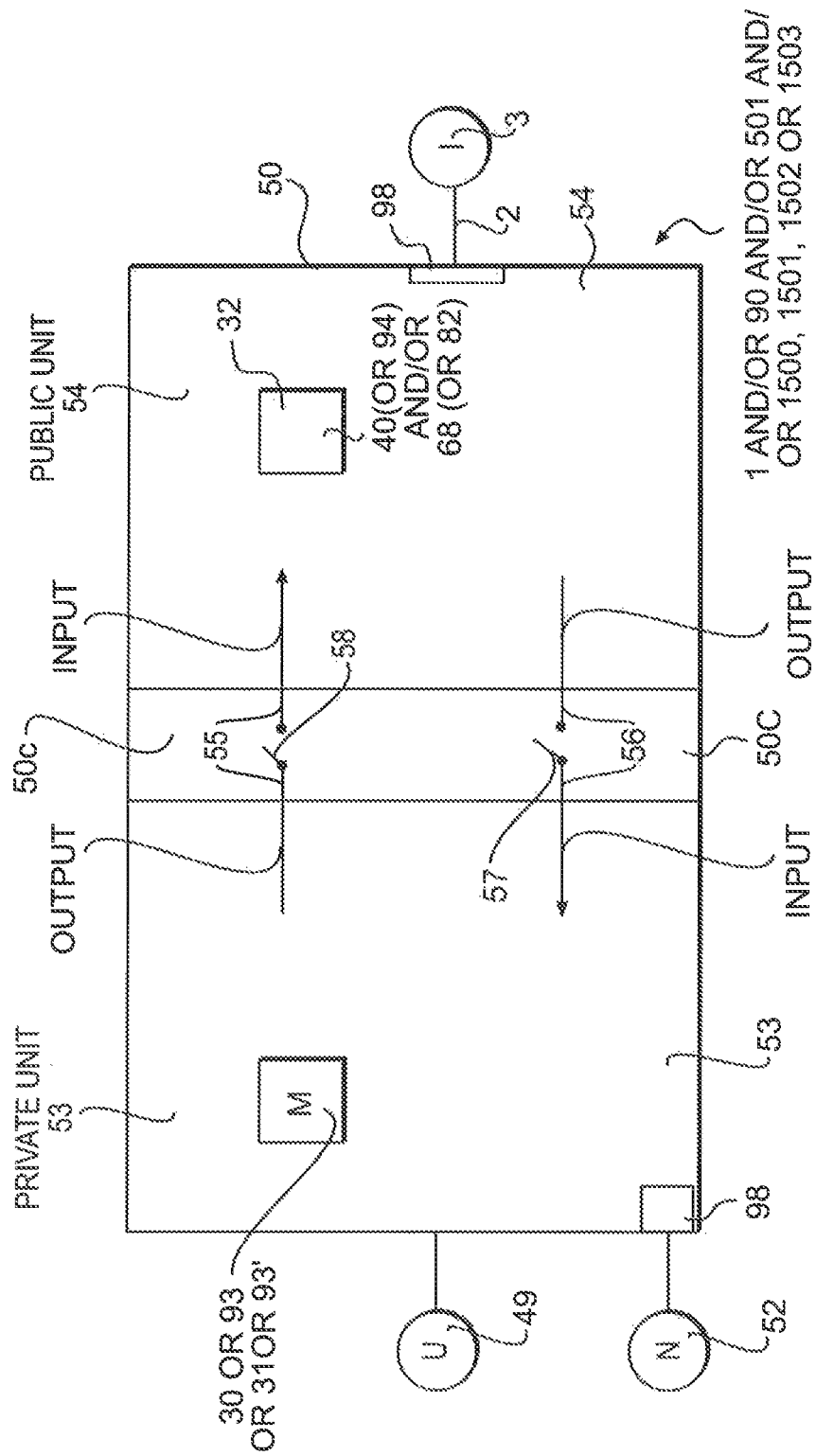
FIG. 4 is a similar example embodiment to that shown in FIGS. 2 and 3, but with Private Unit 53 and Public Unit 54 connected by a hardware-based access barrier or firewall 50c example that also includes an output on/off switch 58 or microcircuit equivalent on the secure, out-only bus or channel 55.
Figure 5:
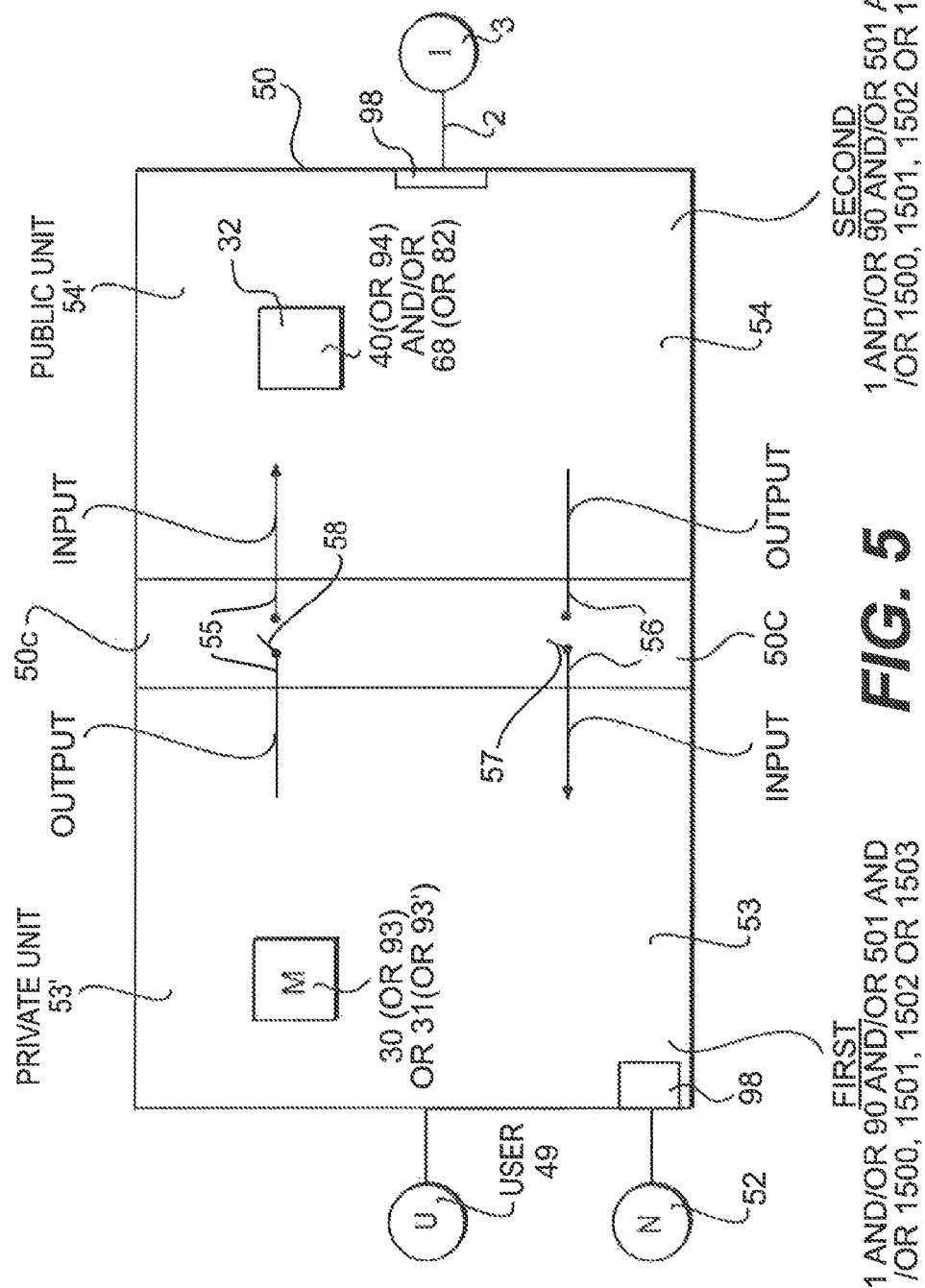
FIG. 5 shows an example embodiment of any computer such as a first personal computer 1 and/or microchip 90 (and/or 501) that is connected to a second computer such as a personal computer 1 and/or microchip 90 (and/or 501), the connection between computers made with the same hardware-based access barrier or firewall 50c example that includes the same buses or channels with on/off switches or equivalents as FIG. 4.
Figure 6:
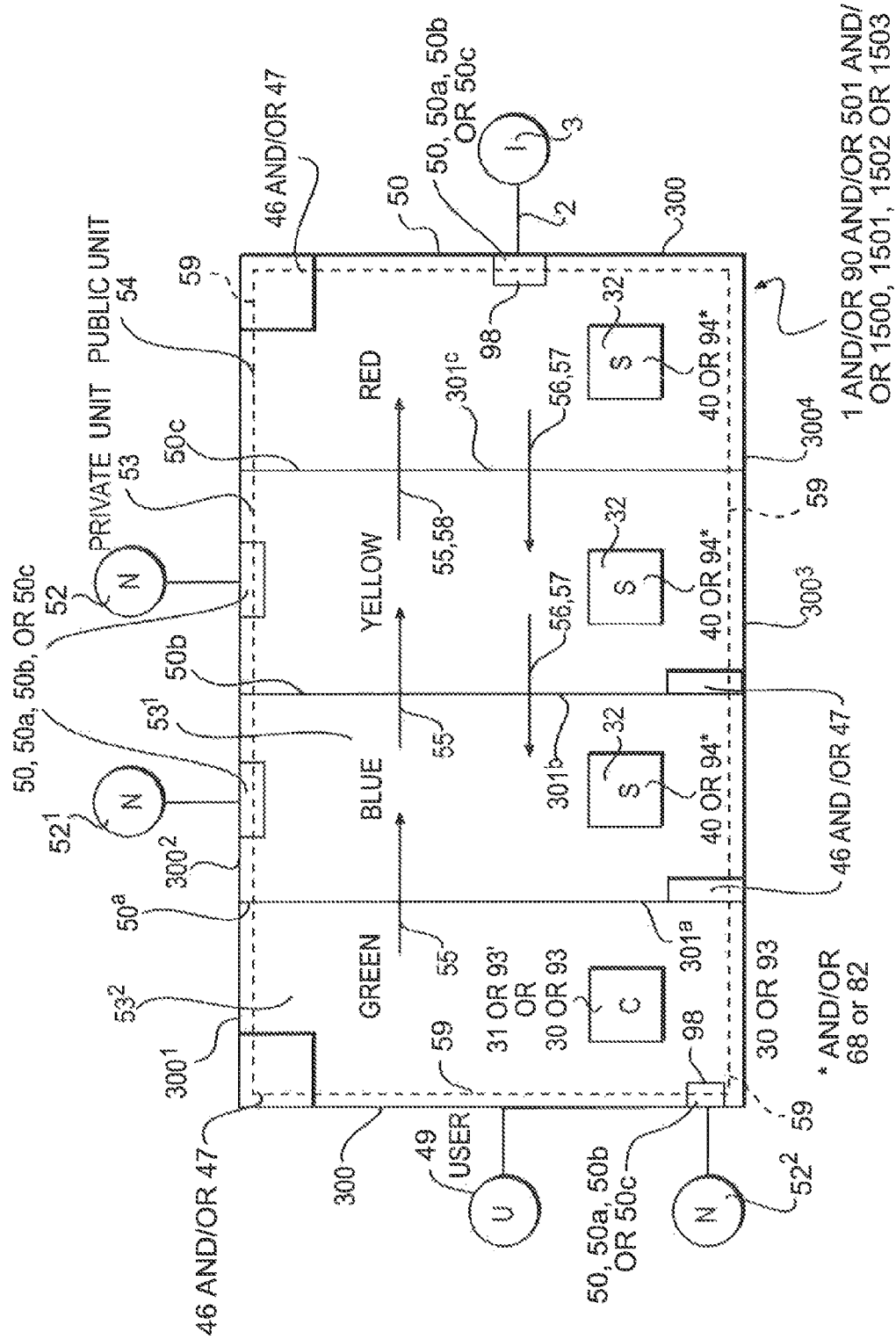
FIG. 6 shows an example embodiment of a personal computer 1 and/or microchip 90 (and/or 501) similar to FIGS. 23A and 23B of the '657 Application, which showed multiple access barriers or firewalls 50 with progressively greater protection, but with hardware-based access barriers or firewalls 50c, 50b, and 50a used successively from a inner private unit 53, to an intermediate more private unit $53^1$, and to an inner most private unit $53^2$, respectively; each Private Unit 53, $53^1$, and $53^2$ has at least one separate connection to at least one separate private or limited-access network.

Finally, FIG. 1 shows schematically within the dashed lines indicated the potential use anywhere in (and in any hardware component of) computer 1 and/or microchip 90 (and/or 501 and/or 1500, 1501, 1502, or 1503) of a field programmable gate array or arrays (FPGA) 59 (or other means of active hardware configuration), including in the Private Unit 53, the Public Unit 54, or the access barriers or firewalls 50, 50*a*, 50*b*, and/or 50*c* that are shown in FIGS. 2-6 and later figures, and including any such barriers or firewalls located between the Private Unit 53 and either the secure private network 52 as shown in FIG. 1 or networks 52, 52$^{1'}$, or 52$^2$ as shown in FIG. 6, for example. The field programmable gate array(s) 59 can be controlled by the master controlling device 30 or 93 or 31 or 93\* using a secure control bus 48, as discussed and shown later in this application. By using FPGA 59 thus controlled securely by the central controller, the access barrier(s) or firewall(s) can be changed at any time, such as from 50*a* to 50*b* or 50*c* or any other change (these new access barriers or firewalls will be discussed in later figures), for example. In addition, FPGA 59 can also change, for example, any of the circuitry in the Private Unit 53 of computer 1 or microchip 90 or 501 (or any other part) while keeping any new such hardware configuration from view or control of any network intruders that may have gained access to the Public Unit 54. Similarly, the FPGA 59 in the Public Unit 54 can be controlled to show one hardware configuration for a while and then securely change it to any other hardware configuration (such as altering access to ports or network connections, for example), either randomly or proactively or in response to a malware attack, by rebooting the new hardware configuration under control of the secure central controlling device in the Private Unit 53 of the microchip or computer and using the secure control bus 48. In this way, a secure dynamic and proactive hardware defense for computers and microchips is possible for the first time. Other useful examples of the potential for use anywhere in computers 1 and/or microchips 90 (and/or 501 and/or 1500, 1501, 1502, or 1503) of a field programmable gate array or arrays (FPGA) 59 (or other means of active hardware configuration) is shown schematically in FIGS. 6, 9, and 11-17 and can be used in a similar way in FIGS. 2-6 as well.

Figure 2:
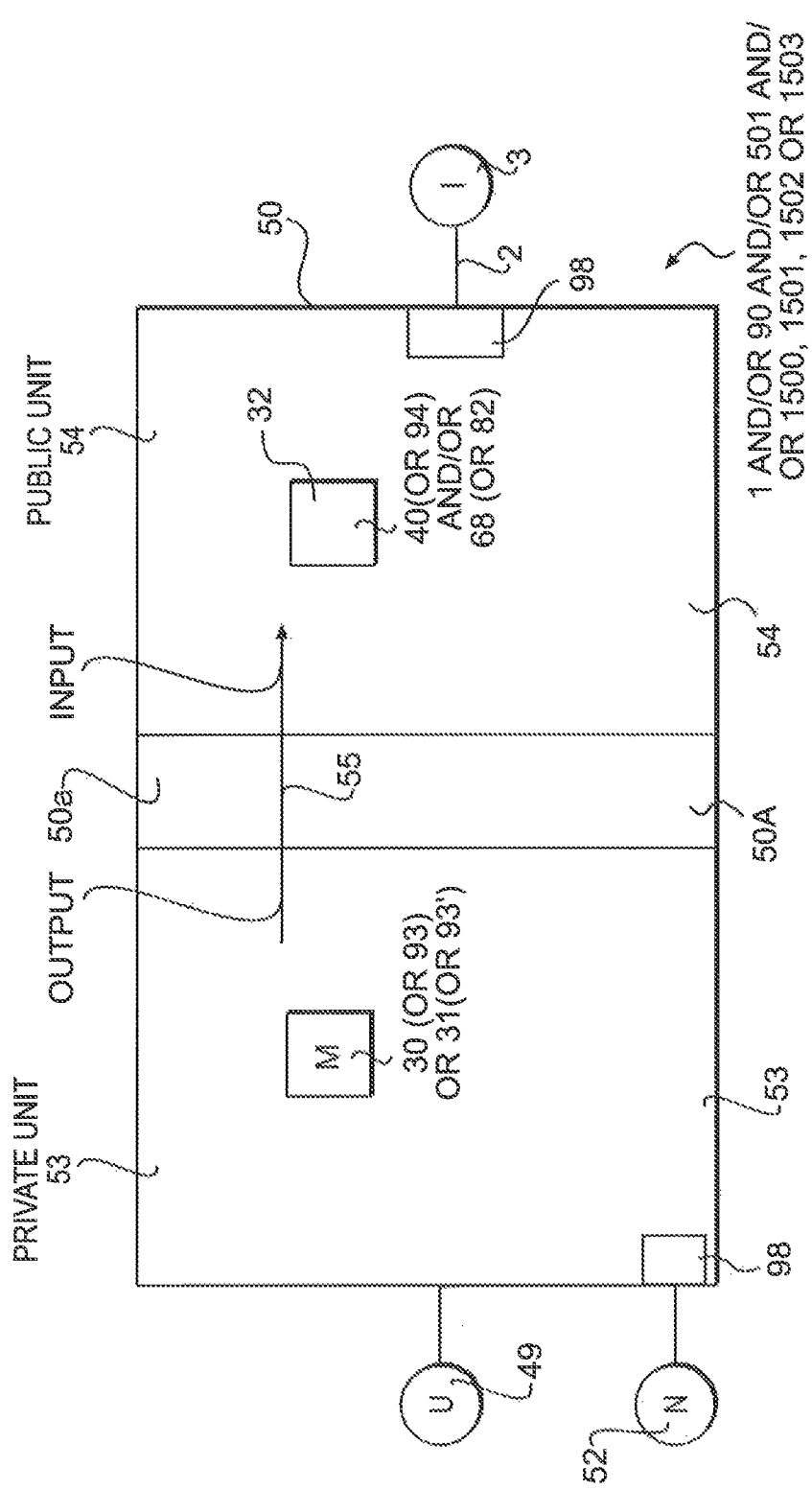
FIG. 2 shows an example embodiment similar to that shown in FIG. 1, including a personal computer 1 and/or microchip 90 (and/or 501) with an inner hardware-based access barrier or firewall 50 separating a Private Unit 53 disconnected from the Internet 3 and a Public Unit 54 connected to the Internet 3, but with the Private Unit 53 and Public Unit 54 connected only by a hardware-based access barrier or firewall 50a, for example in the form of a secure, out-only bus (or wire) or channel 55 (or in an alternate embodiment, a wireless connection, including radio or optical).

FIG. 2 shows an example embodiment that, in terms of communication between the two Units, the Private Unit 53 and Public Unit 54 are connected only by an inner hardware-based access barrier or firewall 50*a* in the form of a secure, out-only bus (or wire) or channel 55 that transmits data or code that is output from the Private Unit 53 to be input to the Public Unit 54. The user 49 controls the Private Unit 53-located master controlling device 30 (or 31 or 93 or 93'), which controls all traffic on the secure out-only bus or channel 55. Connections between the user 49 and the master controlling device 30 (or 31 or 93 or 93'), as well as between the master controlling device 30 (or 31 or 93 or 93') and any component controlled by it, can be for example hardwired on a motherboard (and/or executed in silicon on a microchip 90 and/or 501) to provide the highest level of security.

In the example shown in FIG. 2, there is no corresponding in-only bus or channel 56 transmitting data or code that is output from the Public Unit 54 to be input into the Private Unit 53. By this absence of any bus or channel into the Private Unit 53, all access from the Internet 3 or intervening network 2 to the Private Unit 53 is completely blocked on a permanent basis. Another example is an equivalent wireless connection between the two Units would require a wireless transmitter (and no receiver) in the Private Unit 53 and a receiver (and no transmitter) in the Public Unit 54, so the Private Unit 53 can only transmit data or code to the Public Unit 54 and the Public Unit 54 can only receive data or code from the Private Unit 53 (all exclusive of external wireless transmitters or receivers of the PC1 and/or microchip 90 and/or 501).

The Private Unit 53 can include any non-volatile memory, of which read-only memory and read/write memory of which flash memory (and hard drives and optical drives) are examples, and any volatile memory, of which DRAM (dynamic random access memory) is one common example.

An equivalent connection, such as a wireless (including radio and/or optical) connection, to the out-only bus or channel 55 between the two Units 53 and 54 would require at least one wireless transmitter in the Private Unit 53 and at least one receiver in the Public Unit 54, so the Private Unit 53 can transmit data or code to the Public Unit 54 only (all exclusive of external wireless transmitters or receivers of the PC1 and/or microchip 90 and/or 501).

An architecture for any computer or microchip (or nanochip) can have any number of inner hardware-based access barriers or firewalls 50*a* arranged in any configuration.

FIG. 2 also shows an example embodiment of a firewall 50 located on the periphery of the computer 1 and/or microchip 90 (and/or 501) controlling the connection between the computer and the network 2 and Internet 3; the firewall 50 can be hardwire-controlled directly by the master controlling device 30 (or 31 or 93 or 93'), for example.

Figure 3:
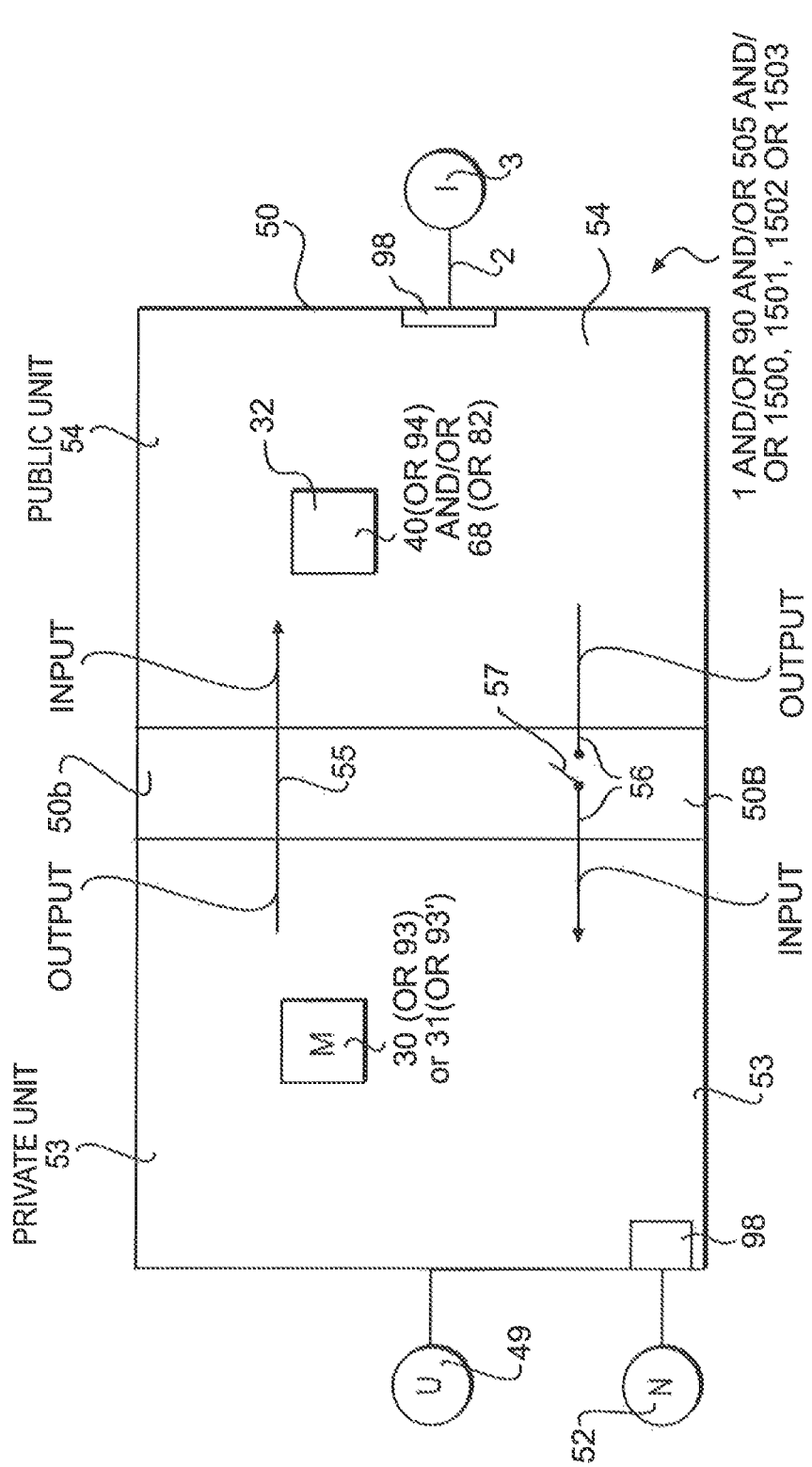
FIG. 3 is an example embodiment similar to that shown in FIG. 2, but with the Private Unit 53 and Public Unit 54 connected by a hardware-based access barrier or firewall 50b example that also includes an in-only bus or channel 56 that includes a hardware input on/off switch 57 or equivalent function signal interruption mechanism, including an equivalent functioning circuit on a microchip or nanochip.

FIG. 3 is a similar useful architectural example embodiment to that shown in FIG. 2, but with the Private Unit 53 and Public Unit 54 connected in terms of communication of data or code by an inner hardware-based access barrier or firewall 50*b* example that includes a secure, out-only bus or channel 55. The connection between units also includes an in-only bus or channel 56 that is capable of transmitting data or code that is output from the Public Unit 54 to be input into the Private Unit 53, strictly controlled by the master controller 30 (and/or 31 and/or 93 and/or 93') in the Private Unit 53. The in-only bus or channel 56 includes an input on/off switch (and/or microchip or nanochip circuit equivalent) 57 that can break the bus 56 Public to Private connection between Units, the switch 57 being controlled by the Private Unit 53-located master controlling device 30 (or 31 or 93 or 93'), which also controls all traffic on the in-only bus or channel 56; the control can be hardwired.

For one example, the master controller 30 (or 31 or 93 or 93') can by default use the on/off switch and/or micro-circuit (or nano-circuit) equivalent 57 to break the connection provided by the in-only bus or channel 56 to the Private Unit 53 from the Public Unit 54 whenever the Public Unit 54 is connected to the Internet 3 (or intermediate network 2). In an alternate example, the master controller 30 (or 31 or 93 or 93') can use the on/off switch and/or micro or nano-circuit equivalent 57 to make the connection provided by the in-only bus or channel 56 to the Private Unit 53 only when very selective criteria or conditions have been met first, an example of which would be exclusion of all input except when encrypted and from one of only a few authorized (and carefully authenticated) sources, so that Public Unit 54 input to the Private Unit 53 is extremely limited and tightly controlled from the Private Unit 53.

Another example is an equivalent connection, such as a wireless (including radio and/or optical) connection, to the in-only bus or channel 56 with an input on/off switch 57 between the two Units 53 and 54 would require at least one wireless receiver in the Private Unit 53 and at least one transmitter in the Public Unit 54, so the Private Unit 53 can receive data or code from the Public Unit 54 while controlling that reception of data or code by controlling its receiver, switching it either "on" when the Public Unit 54 is disconnected from external networks 2 and/or 3, for example, or "off" when the Public Unit 54 is connected to external networks 2 and/or 3 (all exclusive of external wireless transmitters or receivers of the PC1 and/or microchip 90 and/or 501).

An architecture for any computer and/or microchip (or nanochip) can have any number of inner hardware-based access barriers or firewalls 50b arranged in any configuration.

FIG. 4 is a similar useful architectural example embodiment to that shown in FIGS. 2 and 3, but with Private Unit 53 and Public Unit 54 connected in terms of communication of data or code by an inner hardware-based access barrier or firewall 50c example that also includes an output on/off switch and/or microcircuit equivalent 58 on the secure out-only bus or channel 55, in addition to the input on/off switch and/or microcircuit (or nano-circuit) equivalent 57 on the in-only bus or channel 56.

The output switch or microcircuit equivalent 58 is capable of disconnecting the Public Unit 54 from the Private Unit 53 when the Public Unit 54 is being permitted by the master controller 30 (or 31 or 93 or 93') to perform a private operation controlled (completely or in part) by an authorized third party user from the Internet 3, as discussed previously by the applicant relative to FIG. 17D and associated textual specification of the '657 Application incorporated above. The user 49 using the master controller 30 (or 31 or 93 or 93') always remains in preemptive control on the Public Unit 54 and can at any time for any reason interrupt or terminate any such third party-controlled operation. The master controller 30 (or 31 or 93 or 93') controls both on/off switches 57 and 58 and traffic (data and code) on both buses or channels 55 and 56 and the control can be hardwired.

Another example is an equivalent connection, such as a wireless connection, to the in-only bus or channel 56 and out-only bus or channel 55, each with an on/off switch 57 and 58 between the two Units 53 and 54, would require at least one wireless transmitter and at least one receiver in the Private Unit 53, as well as at least one transmitter and at least one receiver in the Public Unit 54, so the Private Unit 53 can send or receive data or code to or from the Public Unit 54 by directly controlling the "on" or "off" state of its transmitter and receiver, controlling that flow of data or code depending, for example on the state of external network 2 or Internet 3 connection of the Public Unit 54 (again, all exclusive of external wireless transmitters or receivers of the PC1 and/or microchip 90 and/or 501).

The buses 55 and/or 56 can be configured to transport control and/or data and/or code between the Units (or any components thereof) of a computer and/or microchip; and there can be separate buses 55 and/or 56 for each of control and/or data and/or code, or for a combination of two of control or data or code.

An architecture for any computer and/or microchip (or nanochip) can have any number of inner hardware-based access barriers or firewalls 50c arranged in any configuration.

FIG. 5 shows an architectural example embodiment of a first computer (personal computer 1 and/or microchip 90 and/or 501 or wafer 1500, or 1501, 1502, or 1503) functioning as a Private Unit 53' that is connected to at least a second computer (or to a multitude of computers, including personal computers 1 and/or microchips 90 and/or 501 or 1500, 1501, 1502, or 1503) functioning as a Public Unit or Units 54'. The connection between the private computer 53' and the public computer or computers 54' is made including the same inner hardware-based access barrier or firewall 50c architecture that includes the same buses and channels 55 and 56 with the same on/off switches 57 and 58 as previously described above in the FIG. 4 example above and can use the same hardwire control. Alternatively, inner hardware-based access barriers or firewalls 50a or 50b can be used. In addition, inner hardware-based access barriers or firewalls 50a, 50b, and 50c can be used within the first and/or second computers.

The connection between the first and second computer can be any connection, including a wired network connection like the Ethernet, for example, or a wireless network connection, similar to the examples described above in previous FIGS. 2-4. In the Ethernet example, either on/off switch 57 or 58 can be functionally replaced like in a wireless connection by control of an output transmitter or an input receiver on either bus or channel 55 or 56; the transmitter or receiver being turned on or off, which of course amounts functionally to mere locating the on/off switches 55 or 56 in the proper position on the bus or channel 55 or 56 to control the appropriate transmitter or receiver, as is true for the examples in previous figures.

FIG. 6 shows a useful architectural example embodiment of any computer (a personal computer 1 and/or microchip 90 and/or 501 or wafer 1500, 1501, 1502, or 1503) similar to FIGS. 23A and 23B of the '657 Application incorporated by reference above, which showed multiple inner firewalls 50 with progressively greater protection. FIG. 6 shows an example of an internal array of inner hardware-based access barriers or firewalls 50c, 50b, and 50a (described in previous FIGS. 2-4 above) used in a specific sequence between a public unit 54 and a first private unit 53, between the first private unit 53 and a more private second unit $53^1$, and between the more private second unit $53^1$ and a most private third unit $53^2$, respectively.

In addition, FIG. 6 shows a useful architectural example embodiment of one or more master controllers C (30 or 93) or master controllers-only (31 or 93') located in the most private unit $53^2$, with one or more microprocessors or processing units or "cores" S (40 or 94) (and/or 68 or 82) located in the more private unit $53^1$, in the private unit 53, and in the public unit 54. Each of the microprocessors or processing units or cores S can have at least one secondary controller 32 with which it can be integrated, for example.

The microprocessors S (or processing units or cores) can be located in any of the computer units, but the majority in a many core architecture can be in the public unit to maximize sharing and Internet use. Alternatively, for computers that are designed for more security-oriented applications, a majority of the microprocessors S (or processing units or cores) can be located in the private units; any allocation between the public and private units is possible. Any other hardware, software, or firmware component or components can be located in the same manner as are microprocessors S (or master controllers-only C) described above.

Figure 13:
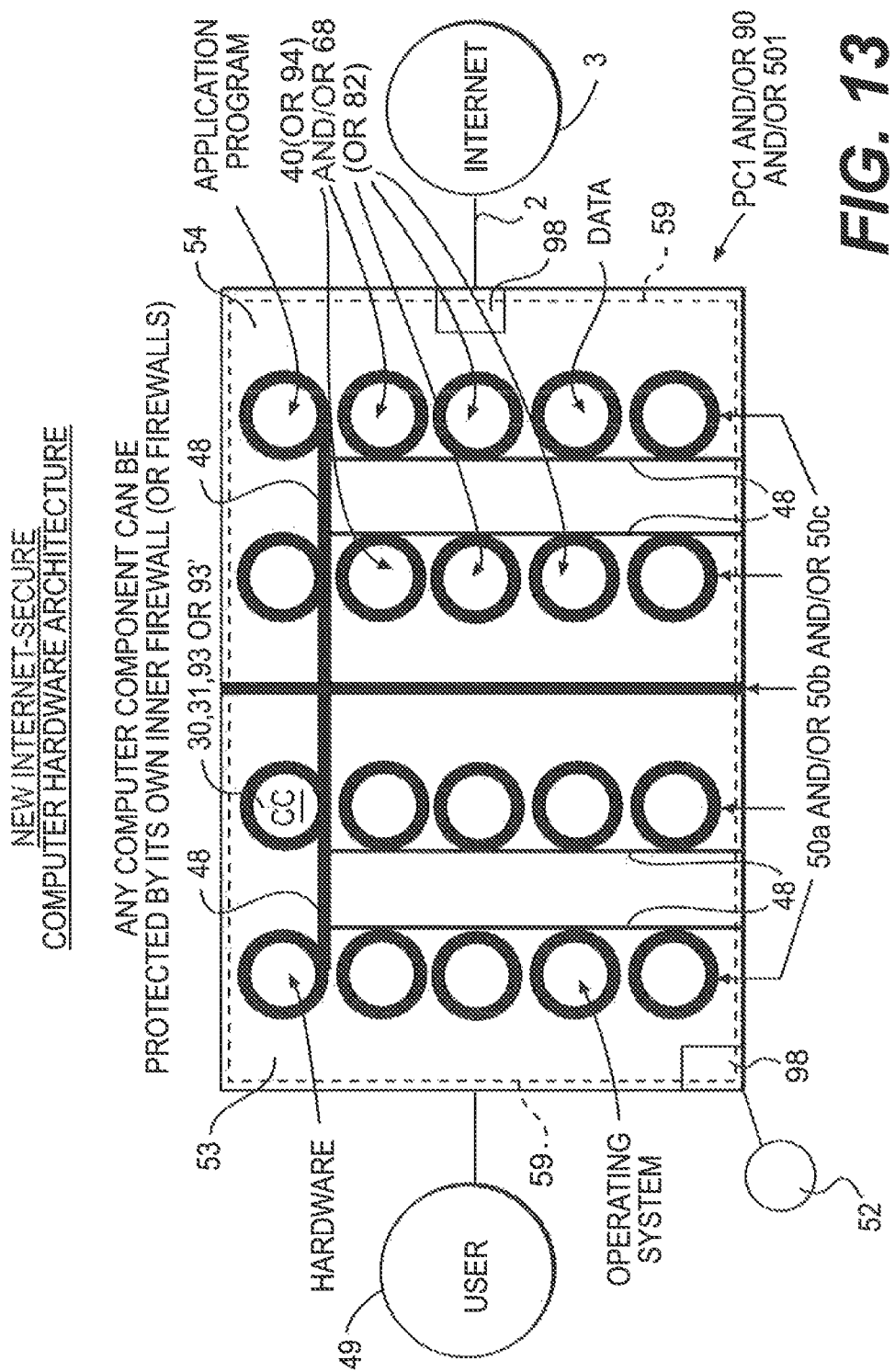
Figure 18:
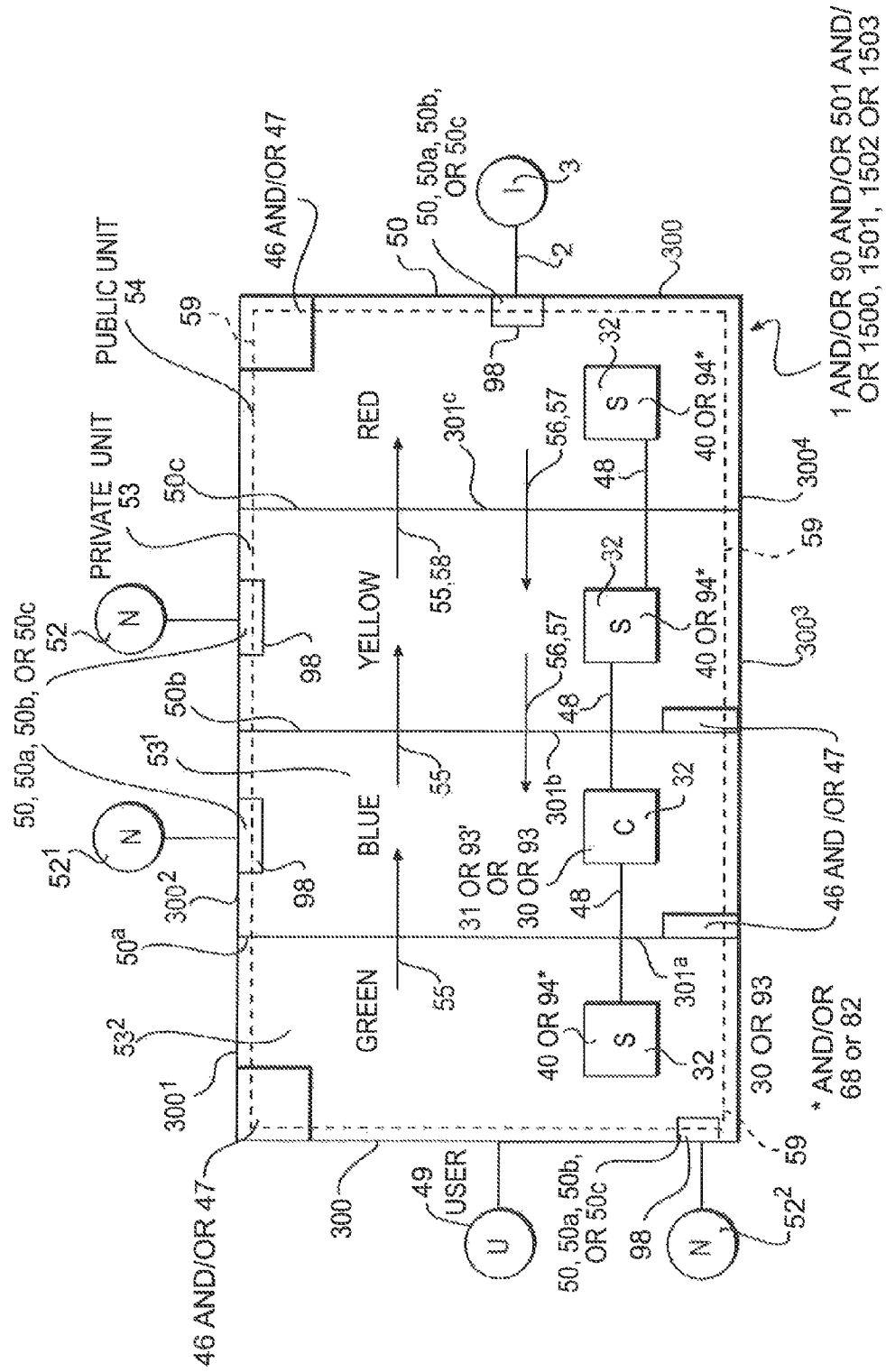
FIG. 18 is like FIG. 6, but shows an embodiment with the central controller (C) positioned in Private Unit $53^1$ and a secondary controller (S) 32 in Private Unit $53^2$.

The one or more master controlling device (M) 30 or master controller unit 93 (or 31 or 93'), sometimes called the central controller (CC) or central processing unit (CPU), can be usefully located in any Private Unit 53, including for example as shown in FIG. 6 in Private Unit $53^2$, or in Private Units $53^1$ or 53, such as utilizing one of the secondary controllers (S) 32 (40 or 94) as the master controller (M or CC), either on a permanent or temporary basis. Particularly on a temporary basis, the master controller (M or CC) can move from one location to another, such as moving from a less private unit 53 to a more private Unit $53^1$ or to a most private Unit $53^2$ in response for example to an increased level in the threat environment or to a direct malware attack, respectively. Such movement can be effected simply by designation or assignment by a user 49 or through the Private Network 52, for example. It is even possible to locate the master controller (M or CC) in at least part of the Public Unit 54, including for example when it has its own access barrier or firewall 50 (including 50a, 50b, and/or 50c), as shown in FIG. 13, and/or when booted in a controlled manner from a Private Unit 53, on a temporary or permanent basis, such as for example when used in a particularly secure environment. Such movement of M or CC noted above can also be effected by field programmable gate array or arrays (FPGA) or another form of active hardware configuration. The existing increasing use of multiple or many microprocessors in computers from smartphones to huge server arrays and supercomputers, in the form of multiple or many processor (CPU) microchips and/or in the form of multiple or many "cores" on a processor microchip, facilitates the easy movement of the master or central controller (M or CC) within a computer 1 and/or microchip 90 (and/or 501 and/or 1500, 1501, 1502, or 1503), since the M or CC can easily be moved from one general purpose processor microchip to another and/or from one general purpose core to another (and/or potentially between hybrid graphics microchips or cores). FIG. 18 is like FIG. 6, but shows an example embodiment with the central controller (C) positioned in Private Unit $53^1$ and a secondary controller (S) 32 in Private Unit $53^2$, temporarily or permanently.

An architecture for any computer and/or microchip or nanochip can have any number of inner hardware-based access barriers or firewalls 50a and/or 50b and/or 50c arranged in any combination or configuration.

As shown in FIG. 6, the private non-Internet network 52, which was discussed previously relative to FIG. 1, can consist in an example embodiment of more than one network, with each additional non-Internet network 52 being used to connect Private Units $53^2$, $53^1$, and 53 of one computer and/or microchip to separate non-Internet networks $52^2$, $52^1$ and 52, respectively, and that are connected to Private Units $53^2$, $53^1$, and 53, respectively, of other computers and/or microchips. That is, each computer and/or microchip Private Unit $53^2$, $53^1$, and 53 can have its own separate, non-Internet network $52^2$, $52^1$, and 52, respectively, and so that any Private Unit can be connected to other computer PC1 and/or microchip 90 (and/or 501) units of the same level of security; any Private Unit can also be subdivided into subunits of the same level of security. This is a useful embodiment example for making relatively local connections from business or home networks and scales up to large business servers, cloud, or supercomputers applications. The connections can be wired or wireless and local or non-local.

Similarly, a computer PC1 and/or microchip 90 or 501 Public Unit 54 can be subdivided into a number of different levels of security, for example, and each subdivided Public Unit 54 can have a separate, non-Internet connected network 52; and a subdivided Public Unit 54 can be further subdivided with the same level of security. In addition, any hardware component (like a hard drive or Flash memory device (and associated software or firmware), within a private (or public) unit of a given level of security can be connected by a separate non-Internet network 52 to similar components within a private (or public) unit of the same level of security.

Any configuration of access barriers or firewalls 50a and/or 50b and/or 50c can be located between any of the private non-Internet-connected networks $52^2$, $52^1$, and 52, and the Private Units $53^2$, $53^1$, and 53, respectively, providing a useful example of increased security control as shown in FIG. 6.

Also shown in the example embodiment of FIG. 6, each Private Unit $53^2$, $53^1$, and 53 can have one or more ports (or connections to one or more ports), like for a USB connection to allow for the use of one or more optional removable access and/or encryption or other keys 46, and/or one or more optional removable memory (such as a USB Flash memory thumbdrive) or other device 47, both of which as discussed previously in the text of FIG. 1, which example can also have one or more ports for either 46 and/or 47 and/or other device. The Public Unit 54 can also have one or more of any such removable devices, or ports like a USB port to allow for them.

Any data or code or system state, for example, for any Public or Private Unit 54 or 53 can be displayed to the personal user 49 and can be shown in its own distinctive color or shading or border (or any other visual or audible distinctive characteristic, like the use of flashing text). FIG. 6 shows an example embodiment of different colors indicated for each of the Units.

For embodiments requiring a higher level of security, it may be preferable to eliminate permanently or temporarily block (by default or by user choice, for example) the non-Internet network $52^2$ and all ports or port connections in the most private unit $53^2$.

The public unit 54 can be subdivided into an encrypted area (and can include encryption/decryption hardware) and an open, unencrypted area, as can any of the private units 53; in both cases the master central controller 30, 31, 93, or 93' can control the transfer of any or all code or data between an encrypted area and an unencrypted area considering factors such authentication.

Finally, FIG. 6 shows the potential use anywhere in computers 1 and/or microchips 90 (and/or 501 and/or 1500, 1501, 1502, or 1503) of a field programmable gate array or arrays (FPGA or other means of active hardware configuration) 59, as described under FIG. 1.

The invention example structural and functional embodiments shown in the above described FIGS. 1-6, as well as the following FIGS. 7-16 and the associated textual specification of this application all most directly relate to the example structural and functional embodiments of the inner firewall 50 described in FIGS. 10A-10D, 10J-10Q, 17A-17D, 23A-23E, 24, 25A-25D and 27A-27G, and associated textual specification, of the above '657 Application incorporated by reference.

Figure 7:
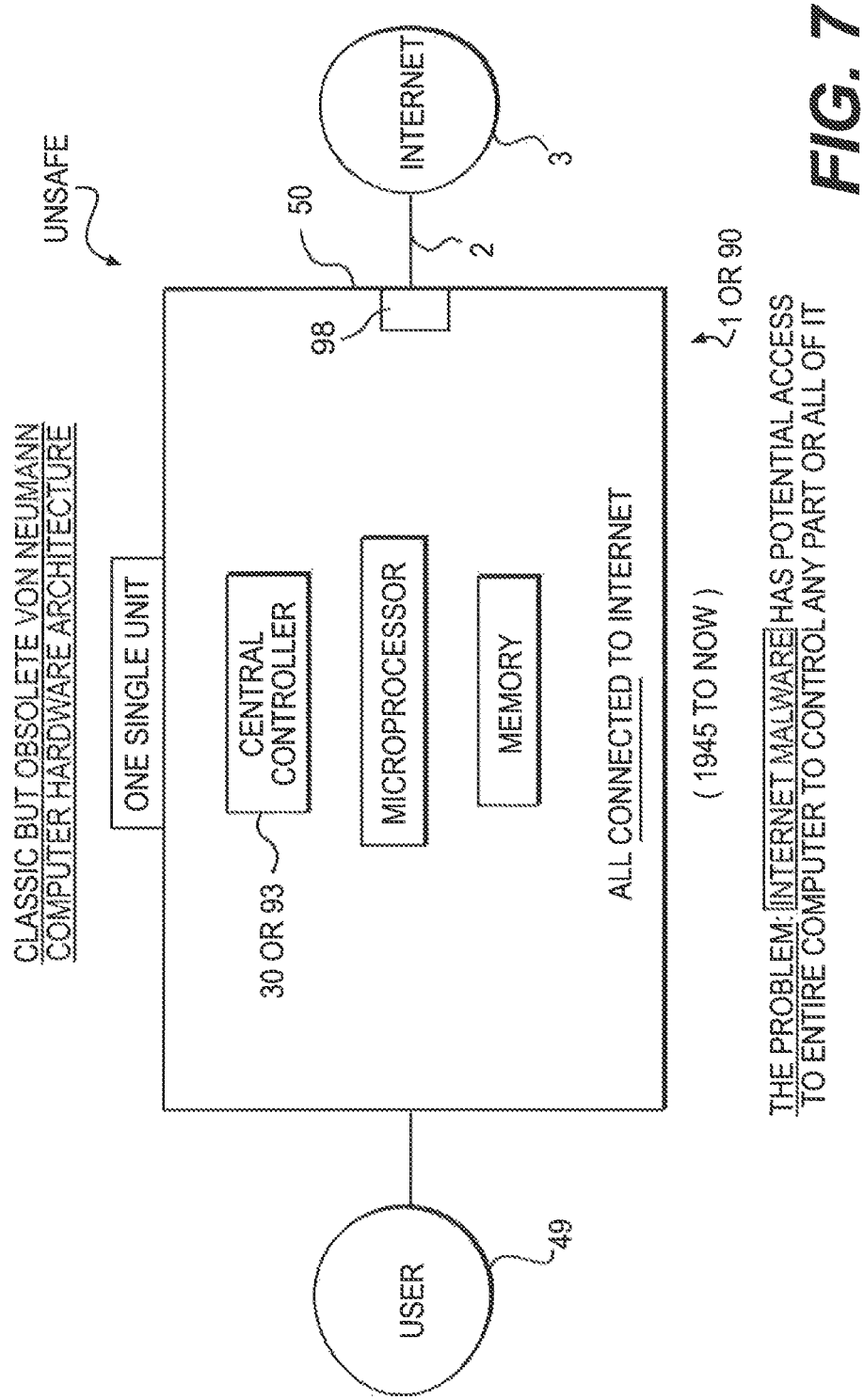
FIG. 7 shows a schematic illustration of a classic Von Neumann computer hardware architecture.

FIG. 7 shows the fundamental security problem caused by the Internet connection to the classic Von Neumann computer hardware architecture that was created in 1945. At that time there were no other computers and therefore no networks of even the simplest kind, so network security was not a consideration in its fundamental design, which is unsafe for use when connected to an open insecure public network of enormous scale, such as the Internet.

FIGS. 8-14 are useful architectural example embodiments of the inner hardware-based access barriers or firewalls 50a, 50b, and 50c.

Figure 8:
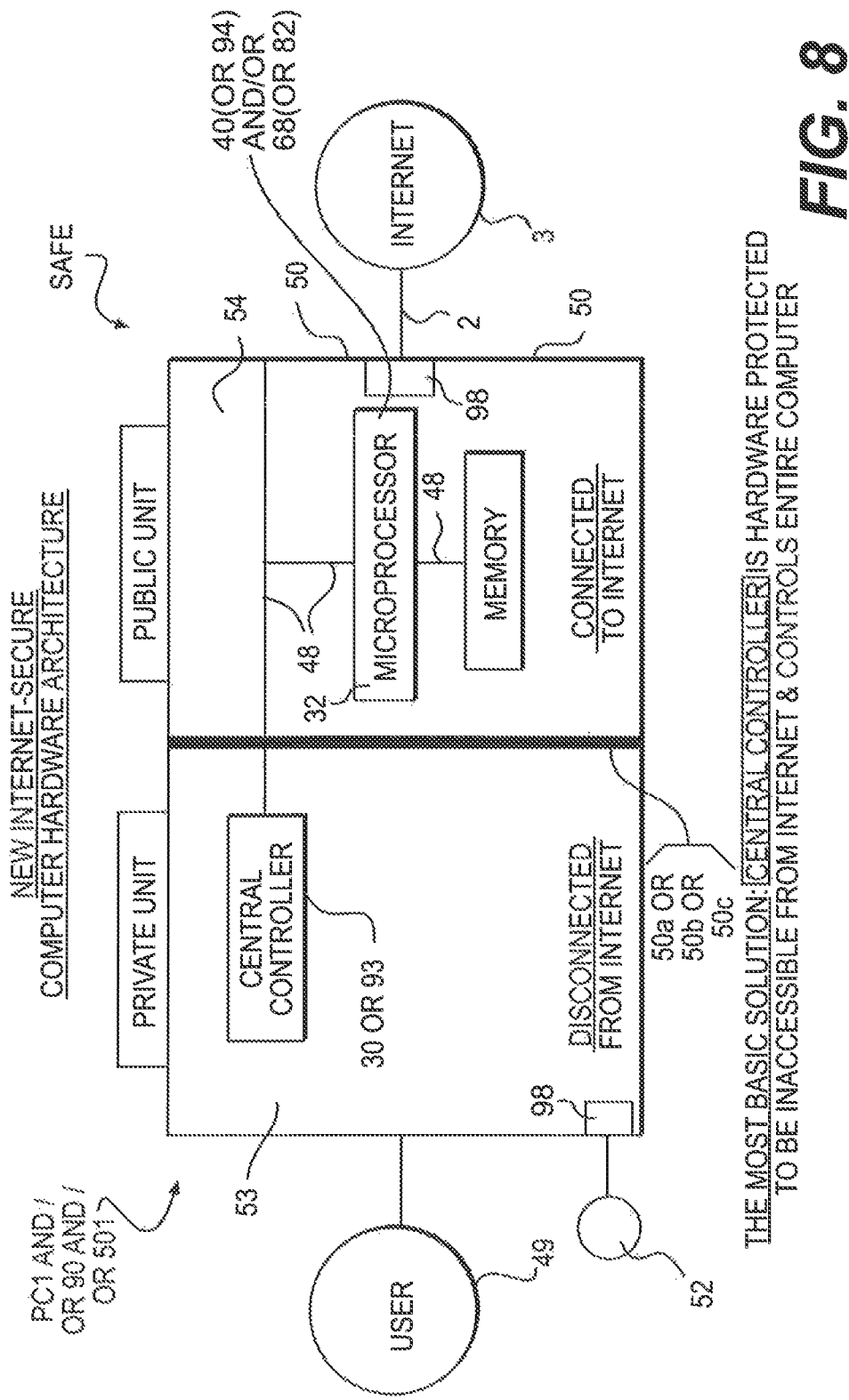
FIGS. 8-14 are additional architectural schematic embodiment examples of 48 the use of hardware-based access barriers or firewalls 50a, 50b, and 50c to create multiple compartments, as well as secure control buses and Faraday Cages.

FIG. 8 shows a useful example embodiment of the applicant's basic architectural solution to the fundamental security problem caused by the Internet, the solution being to protect the central controller of the computer with an inner firewall 50 controlling access by the Internet, as discussed in detail in FIGS. 10A-10D and 10J-10Q, and associated textual specification of the '657 Application, those specific drawing and text portions of which are incorporated by reference in this application; they were discussed as well as earlier in this application. FIG. 8 and subsequent figures describe example embodiments of a number of specific forms of an inner hardware-based access barrier or firewall 50, such as access barriers or firewalls 50a and/or 50b and/or 50c as described previously in this application; the number and potential configurations of access barriers or firewalls 50a and/or 50b and/or 50c within any computer, such as computer PC 1 and/or microchip 90 (and/or 501) is without any particular limit.

Figure 9:
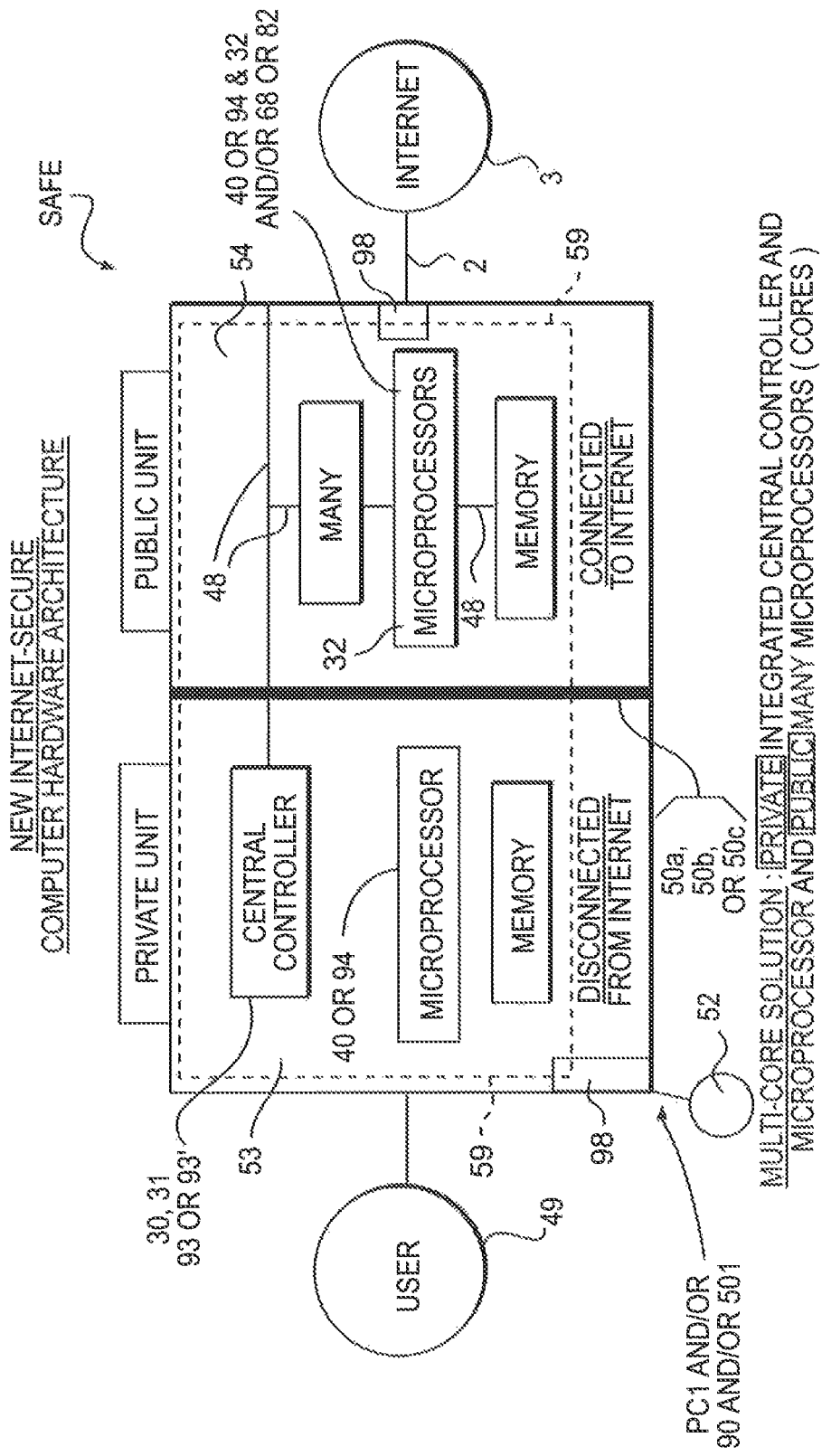

FIG. 9 is a similar embodiment to FIG. 8, but also showing a useful architectural example of a central controller integrated with a microprocessor to form a conventional general purpose microprocessor or CPU (like an Intel x86 microprocessor, for example). FIG. 8 also shows a computer PC1 and/or microchip 90 and/or 501 with many microprocessors or cores.

Finally, FIG. 9 shows the potential use anywhere in computers 1 and/or microchips 90 (and/or 501 and/or 1500, 1501, 1502, or 1503) of a field programmable gate array or arrays (FPGA) 59 (or other means of active hardware configuration), as described under FIG. 1.

Figure 10:
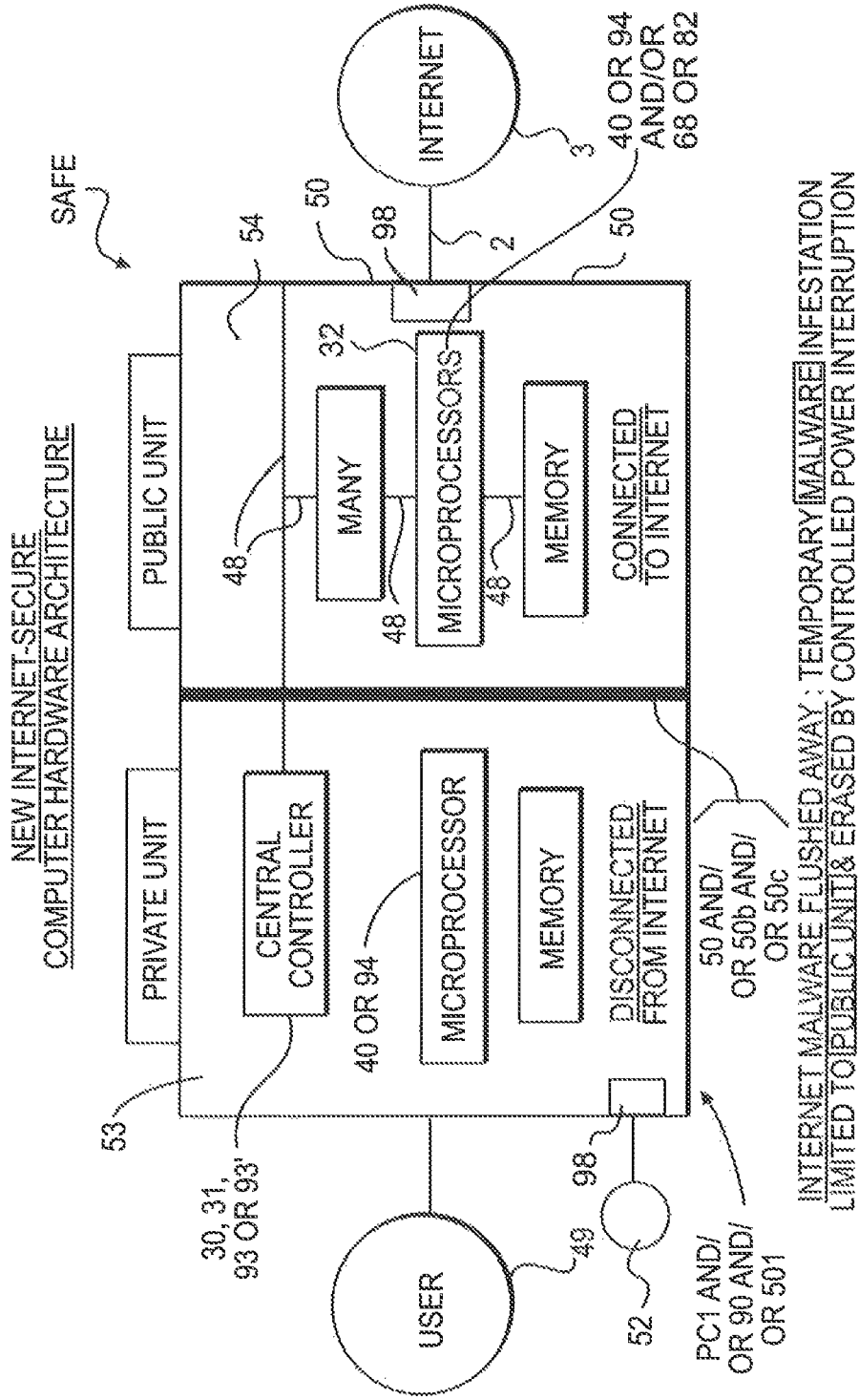

FIG. 10 is the same embodiment as FIG. 9, but also shows a major functional benefit of the applicant's access barrier or firewall 50a, 50b, and 50c invention, which is to enable a function to flush away Internet malware by limiting the memory access of malware to DRAM 66 (dynamic random access memory) in the Public Unit 54, which is a useful example of a volatile memory that can be easily and quickly erased by power interruption. The flushing function use of a firewall 50 was discussed earlier in detail in FIGS. 25A-25D and associated textual specification of the '657 Application and those specific drawing and text portions of the '657 Application are incorporated by reference herein. After being flushed, the Public Unit 54 can be rebooted from the Private Unit 53 by the central controller using the secure control bus 48 to be discussed and shown later.

Figure 11:
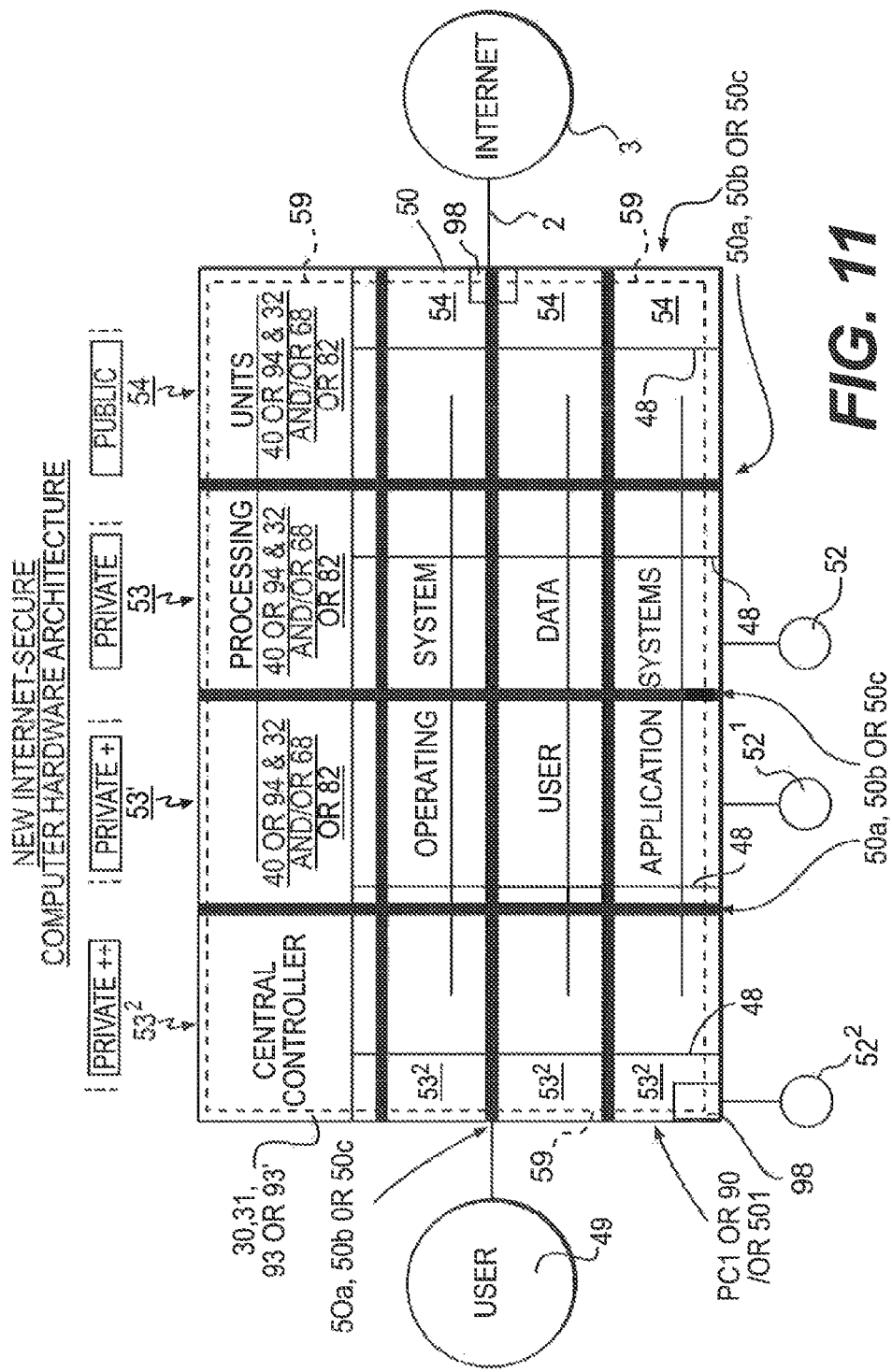

FIG. 11 is a useful example embodiment similar to FIG. 6 and shows that any computer or microchip can be partitioned into many different layers of public units 54 and private units 53 using an architectural configuration of access barriers or firewalls 50a, 50b, and 50c; the number and arrangement of potential configurations is without any particular limit; and the number of microprocessors 40 or 94 and/or 68 or 82 in the public unit 53 can be potentially any number, including 1 or 2 or 3 or at least 4 or 8 or 16 or 32 or 64 or 128 or 256 or 512 or 1024 or many more, as could potentially be the case in prior or subsequent figures. The partition architecture provided by firewalls 50 was discussed earlier in detail in FIGS. 23A-23B and associated textual specification of the '657 Application and those specific drawing and text portions are incorporated by reference herein.

Finally, FIG. 11 shows the potential use anywhere in computers 1 and/or microchips 90 (and/or 501 and/or 1500, 1501, 1502, or 1503) of a field programmable gate array or arrays (FPGA) 59 (or other means of active hardware configuration), as described under FIG. 1.

Figure 12:
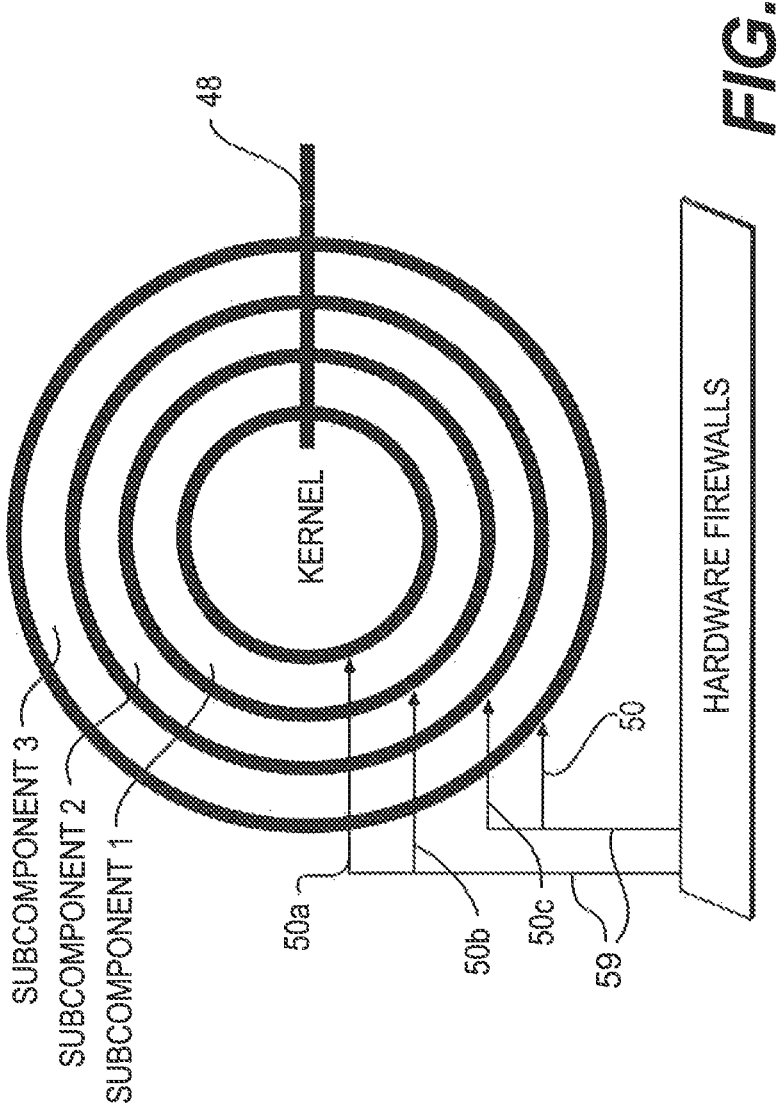

FIG. 12 is another useful architectural example embodiment of the layered use of access barriers or firewalls 50, 50c, 50b, and 50c based on a kernel or onion structure; the number of potential configurations including relative to layers or types of access barriers or firewalls is without any particular limit. This structure was discussed in detail relative to firewalls 50 in FIGS. 23D-23E and associated textual specification of the '657 Application and those specific drawing and text portions are incorporated by reference herein.

FIG. 12 also shows the potential use anywhere in computers 1 and/or microchips 90 (and/or 501 and/or 1500, 1501, 1502, or 1503) of a field programmable gate array or arrays (FPGA) 59 (or other means of active hardware configuration), as described under FIG. 1.

FIG. 13 is a useful architectural example embodiment showing the presence of many FIG. 12 example embodiments with layered access barriers or firewalls 50a, 50b, and 50c structures on all of the many hardware, software, and/or firmware components of a computer; the number of FIG. 12 embodiments or their potential configurations including relative to layers or types of access barriers or firewalls is without any particular limit in either the private unit 53 or the public unit 54 of any computer or microchip. The many layered kernels structure was discussed in more detail in FIG. 23C and associated textual specification of the '657 Application and those specific drawing and text portions are incorporated by reference earlier. Note that any subcomponent or kernel of the FIG. 12 example embodiment can be protected by a hardware-based access barrier 50a (or 50b or 50c or 50), a secure, out-only bus or channel 55, and therefore can for example be effectively disconnected from any input from any network, including either the secure private network 52 and the insecure public network including the Internet 3.

FIG. 13 shows the potential use anywhere in computers 1 and/or microchips 90 (and/or 501 and/or 1500, 1501, 1502, or 1503) of a field programmable gate array or arrays (FPGA) 59 (or other means of active hardware configuration), as described under FIG. 1.

Figure 14:
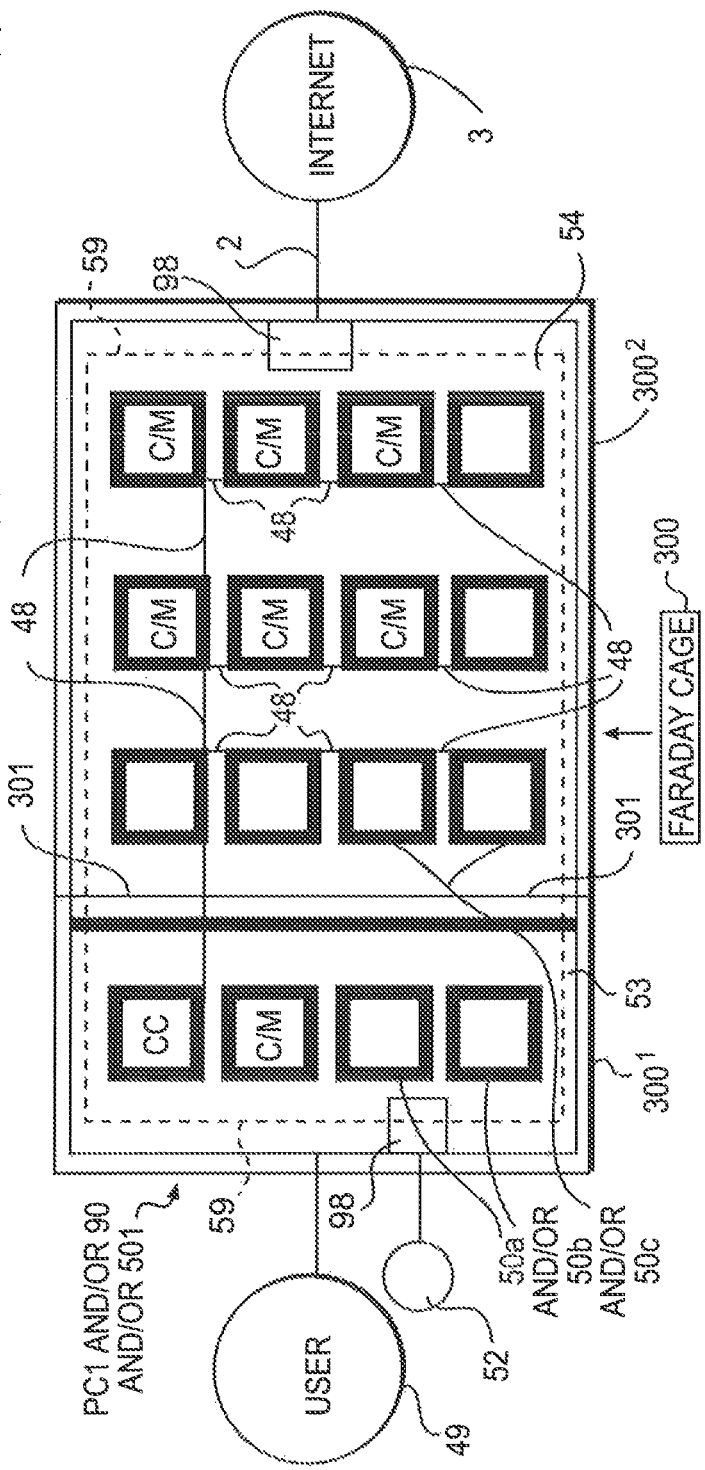

FIG. 14 is a useful architectural example embodiment similar to FIG. 13, but also showing the computer PC1 and/or microchip 90 and/or 501 surrounded by a Faraday Cage 300; the number of potential similar configurations is without any particular limit. This use of Faraday Cages 300 was discussed in detail in FIGS. 27A-27G and associated textual specification of the '657 Application and those specific drawing and text portions are incorporated by reference herein.

FIG. 14 shows a useful example embodiment of a Faraday Cage 300 surrounding completely a computer PC1 and/or microchip 90 and/or 501. The Faraday Cage 300 can be subdivided by an example partition 301 to protect and separate the Private Unit 53 from the Public Unit 54, so that the Private Unit 53 is completely surrounded by Faraday Cage 300[1] and Public Unit 54 is completely surrounded by Faraday Cage 300[2], in the example embodiment shown. Each unit can alternatively have a discrete Faraday Cage 300 of its own, instead of partitioning a larger Faraday Cage 300 and the surrounding of a Unit can be complete or partial. Any number or configuration of Faraday Cages can be used in the manner shown generally in FIG. 14, including a separate Faraday Cage for any hardware component of the computer or microchip. The Faraday Cages can provide protection against an external electromagnetic pulse, including massive ones, and against external surveillance or internal surveillance including between private and public portions of a computer and/or microchip or nanochip.

Finally, FIG. 14 shows the potential use anywhere in computers 1 and/or microchips 90 and/or 1500, 1501, 1502, or 1503 of a field programmable gate array or arrays (FPGA) 59 (or other means of active hardware configuration), as described under FIG. 1.

The example embodiments shown in FIGS. 1-4, 6-11, and 13-19 are a computer of any sort, including a personal computer PC1; or a microchip 90 or 501, including a microprocessor or a system on a chip (SoC) such as a personal computer on a microchip 90; or a combination of both, such as a computer with the architecture shown in FIGS. 1-4, 6-11, and 13-19, the computer also including one or more microchips also with the architecture shown in FIGS. 1-4, 6-11, and 13-19.

The Public Unit 54 shown in FIGS. 1-6, 8-11, and 13-17 can be used in a useful embodiment example to run all or a part of any application (or "apps") downloaded from the Internet or Web, such as the example of any of the many thousands of apps for the Apple iPhone that are downloaded from the Apple Apps Store, or to run applications that are streamed from the Internet or Web. Similarly, all or part of a video or audio file like a movie or music that would otherwise be protected by digital management rights can be downloaded or streamed from the Web and played in the Public Unit 54 for viewing and/or listening be the computer user 49, while at the same time that user 49 has no control over the Public Unit 54 to copy the protected files since he can be denied access to those functions during the download or streaming.

Some or all personal data pertaining to a user 49 can be kept exclusively on the user's computer PC1 and/or microchip 90 and/or 501 for any cloud application or app to protect the privacy of the user 49 (or kept non-exclusively as a back-up), unlike conventional cloud apps, where the data of a personal user 49 is kept in the cloud. In existing cloud architectures, user data is separated and protected only by software, not hardware, and there can be potentially shared intentionally or carelessly compromised without authorization by or knowledge of the personal user 49. In effect, the Public Unit 54 can function as a safe and private local cloud, with personal files can be operated on there using cloud apps downloaded from a cloud web site and those personal files can be retained in the Private Unit 53 after the operation is completed. All or part of an app can also potentially be downloaded or streamed to one or more Private Units, including $53^2$, $53^1$, and 53, and retained or used for local operations either in the Private Unit or in a Public Unit, in the manner that apps are currently.

Privacy in conventional clouds can also be significantly enhanced using the inner hardware-based access barriers or firewalls 50a and/or 50b and/or 50c described in this application, since each individual or corporate user of the cloud can be assured that their data is safe because it can be physically separated and segregated by hardware, instead of by software alone, as is the case currently.

Similarly, the example embodiment of FIG. 6 shows a computer and/or microchip Public Unit 54 and Private Units 53, $53^1$, and $53^2$, each with a separate Faraday Cage. $300^4$, $300^3$, $300^2$, and $300^1$, respectively, that are create using partitions $301^c$, $301^b$, and $301^a$, respectively. Any Public Unit 54 or Private Unit 53 can be protected by its own Faraday Cage 300. The Faraday Cage 300 can completely or partially surround the any Unit in two or three dimensions.

FIGS. 8-11 and 13-14 also show example embodiments of a secure control bus (or wire or channel) 48 that connects the master controlling device 30 (or 31) or master control unit 93 (or 93') or central controller (as shown) with the components of the computer PC1 and/or microchip 90 and/or 501, including those in the Public Unit 54. The secure control bus 48 provides hardwired control of the Public Unit 54 by the central controller in the Private Unit 53. The secure control bus 48 can be isolated from any input from the Internet 3 and/or an intervening other network 2 and/or from any input or monitoring from any or all parts of the Public Unit 54. The secure control bus 48 can provide and ensure direct preemptive control by the central controller over any or all the components of the computer, including the Public Unit 54 components. The secure control bus 48 can, partially or completely, coincide or be integrated with the bus 55, for example. The secure control bus 48 is configured in a manner such that it cannot be affected, interfered with, altered, read or written to, or superseded by any part of the Public Unit 54 or any input from the Internet 3 or network 2, for example. A wireless connection can also provide the function of the secure control bus 48 a manner similar to that describing wireless connections above in FIGS. 2-6 describing buses 55 and 56.

The secure control bus 48 can also provide connection for the central controller to control a conventional firewall or for example access barrier or firewall 50c located on the periphery of the computer or microchip to control the connection of the computer PC1 and/or microchip 90 and/or 501 to the Internet 3 and/or intervening other network 2.

The secure control bus 48 can also be used by the master central controller 30, 31, 93, or 93' to control one or more secondary controllers 32 located on the bus 48 or anywhere in the computer PC1 and/or microchip 90 and/or 501, including in the Public Unit 54 that are used, for example, to control microprocessors or processing units or cores S (40 or 94) located in the Public Unit 54. The one or more secondary controllers 32 can be independent or integrated with the microprocessors or processing units or cores S (40 or 94) shown in FIGS. 9 and 11 above, for example; such integrated microprocessors can be a special purpose design or a common general purpose microprocessors like an Intel x86 microprocessor, for example.

Figure 15:
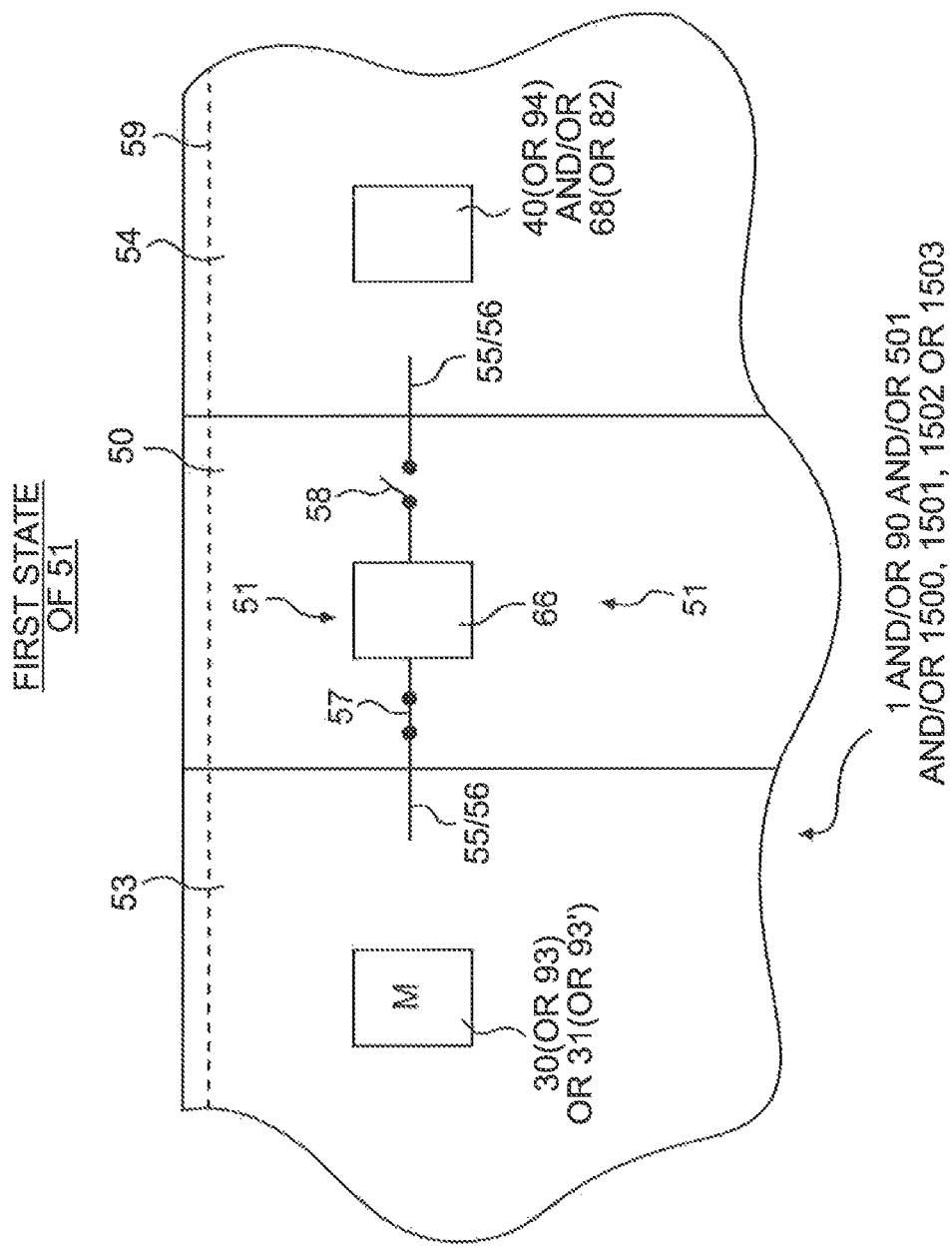
FIGS. 15 and 16 show a lock mechanism 51 in access barrier/firewall 50 that enables a highly controlled method of transferring data or code between computer or microchip units separated by 50, such as between a Private Unit 53 and a Public Unit 54.

FIG. 15 is an enlargement of the upper central portion of FIG. 1 showing a computer 1 and/or microchip 90 (and/or 501 and/or 1500, 1501, 1502, or 1503) and also shows a lock mechanism 51 in at least one hardware-based access barrier/firewall 50 for the transfer of data or code between units separated by access barrier/firewall 50, such as between the Private Unit 53 and the Public Unit 54.

FIG. 15 shows at least one random access memory RAM 66, which includes any volatile RAM, of which DRAM is a common example; volatile RAM is particularly useful because of its speed and ease of erase, such as by power interruption. The at least one RAM 66 component is located in the access barrier/firewall 50 and is connected to both units like the Public and Private Units 54 and 53 separated by the access barrier/firewall 50; the connection can be made, for example, by a bus, which can be unidirectional like 55 and 56 discussed in previous figures, or bidirectional like 55/56 shown in FIG. 15.

As shown, the access barrier/firewall lock mechanism 51 includes at least one switch 58 that is located between the RAM 66 component and the Public Unit 54 and is shown in the open position so that transmission of data and/or code is interrupted or blocked between RAM 66 and Public Unit 54. In addition, the lock mechanism 51 includes at least one switch 57 that is located between the RAM 66 component and the Private Unit 53 and is shown in the closed position so that the transmission of data and/or code is enabled between RAM 66 and Private Unit 53.

FIG. 15 shows the first state of what is an either/or condition of the access barrier/firewall lock mechanism 51. In the first state shown, data and/or code can be transmitted between the at least one RAM 66 component and the Private Unit 53 in either or both directions, but is blocked in both directions between the RAM 66 component and the Public Unit 54.

Finally, FIG. 15 shows the potential use anywhere in computers 1 and/or microchips 90 and/or 1500, 1501, 1502, or 1503 of a field programmable gate array or arrays (FPGA) 59 (or other means of active hardware configuration), as described under FIG. 1.

Figure 16:
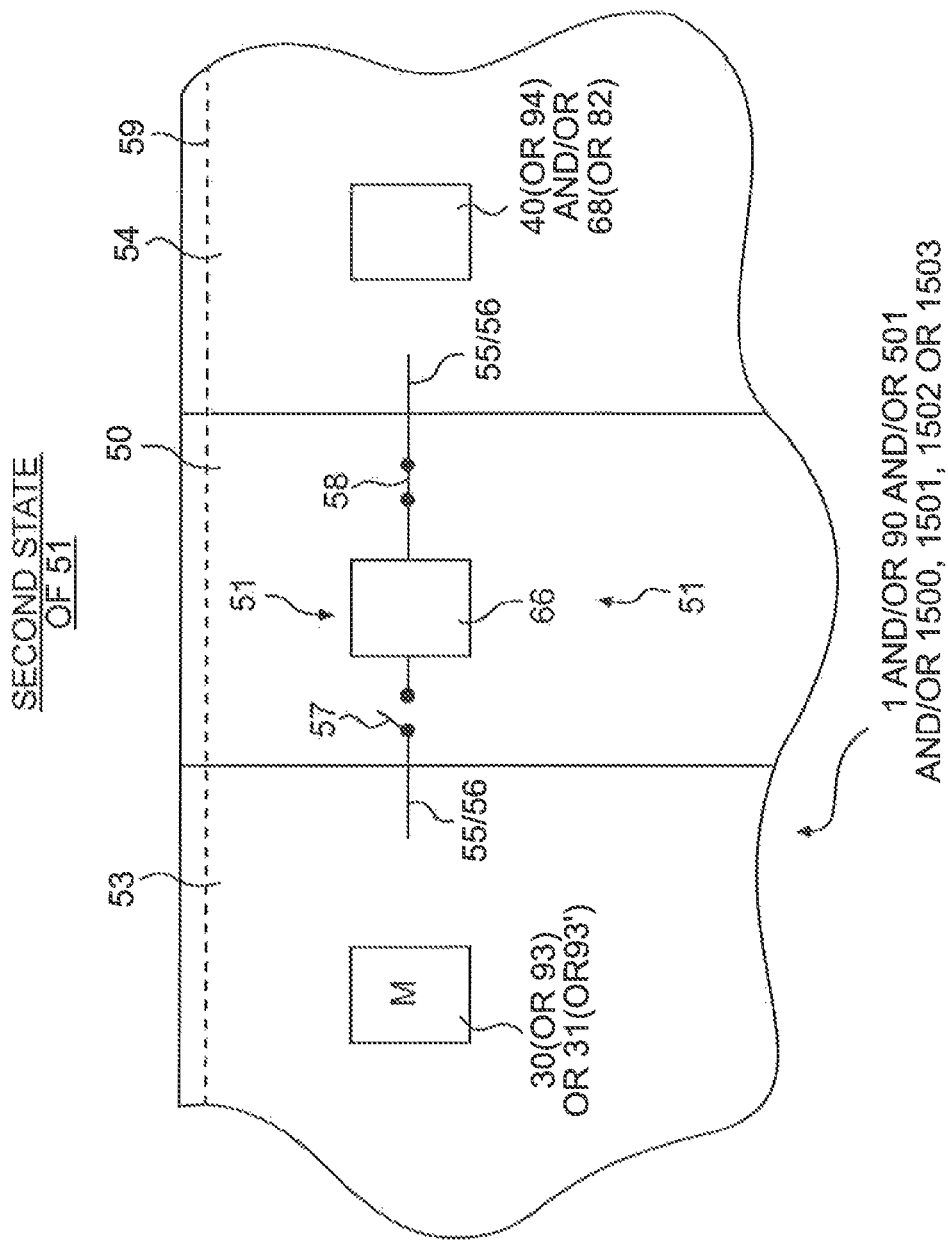

FIG. 16 is like FIG. 15 and shows the at least one access barrier/firewall lock mechanism 51, but shows the opposite condition of both switches 57 and 58 from that shown in FIG.

15. Switch 57 is shown in the open position so that the transmission of data and/or code is interrupted or blocked between RAM 66 and the Private Unit 53. Switch 58 is shown in the closed position so that the transmission of data and/or code is enabled between RAM 66 and the Public Unit 54.

FIG. 16 thus shows the second state of the either/or condition of the access barrier/firewall lock mechanism 51. In the second state shown, data and/or code can be transmitted between the RAM 66 component and the Public Unit 54 in either or both directions, but is blocked in either direction between the RAM 66 component and the Private Unit 53.

The access barrier/firewall lock mechanism 51 can include any number of the RAM 66 components, buses 55, 56, or 55/56, and switches 57 and 58 in any useful configuration in any of the access barriers/firewalls 50 shown in other figures of this application or in the applicant's previous related applications and patents that have been incorporated by reference. Any other components of the computer or microchip can also be incorporated temporarily or permanently in any lock mechanism 51 to provide additional useful functions. Any or all of the components of the lock mechanism can be controlled through the secure control bus 48.

In a general way, the lock mechanism 51 example shown in FIGS. 15 and 16 functions like a canal lock, which enable canal boats to avoid natural river rapids and instead be safely raised or lowered to different canal water levels by opening a first canal gate to allow a boat to enter at, for example, a lower water level and then shutting that first gate. Water is then allowed to enter the canal lock from the second gate, which holds back a higher level of water on the other side of the canal lock and which was shut when the boat first entered the canal lock. When a sufficient amount of water has entered the lock so that the water level is as high as that outside the second gate, the second gate can be opened to allow the boat to continue at the higher water level.

So in a manner like the canal lock allowing a boat to safely move between different water levels of a canal, the access barrier/firewall lock mechanism 51 allows data and/or code to move in a safely controlled fashion between different hardware-based security levels in a microchip or computer. The lock mechanism 51 allows data and/or code to be transmitted between different levels of microchip 90 (or computer 1 hardware) security, such as between a Public Unit 54 and a Private Unit 53, in a manner of transmission that can be controlled by the master controlling mechanism of the computer 1 and/or microchip 90 (and/or 501, and/or 1500, 1501, 1502, or 1503) using the secure control bus 48, for example.

The at least one lock mechanism 51 can provide other advantageous embodiments besides the either/or state described above, but the either/or state embodiment of the lock mechanism 51 described in FIGS. 15 and 16 does provide the definite benefit of allowing one and only one of either the Public Unit 54 or the Private Unit 53 to read and/or write to the RAM 66 component of the access barrier/firewall 50 at any given time, thus provide a high degree of secure control. No simultaneous access by both Units 53 and 54 would be possible with the locking mechanism 51 operating on the either/or state example shown.

The one or more access barrier/firewall lock mechanism 51 can include other computer or microchip components besides the one or more RAM 66 component shown that are useful to fulfill the lock mechanism's general function, as well as to provide other security functions between units such as screening or testing data and/or code to be transmitted between units.

The RAM 66 component of the lock mechanism 51 shown in FIGS. 15 and 16 can be controlled using the secure control bus 48, including through the memory controller of the RAM 66 component.

Finally, FIG. 16 shows the potential use anywhere in computers 1 and/or microchips 90 and/or 1500, 1501, 1502, or 1503 of a field programmable gate array or arrays (FPGA) 59 (or other means of active hardware configuration), as described under FIG. 1.

FIG. 17A is similar to FIGS. 15 and 16 and shows one or more buffer zones 350 that functions like a DMZ (demilitarized zone) or moat between a Public Unit 54 and an access barrier/firewall 50; it is a physical barrier forming a boundary or zone without circuitry between Public and Private Units 54 and 53 so that any potential backdoor connections cannot be disguised in within a highly complex pattern of circuitry on a microchip (or motherboard of a computer, such as a smart phone, tablet computer, or personal computer); except for interruptions for authorized connections like the at least one secure control bus 48 (or buses 55, 56 or 55/56), an otherwise continuous boundary completely separating two units, such as the Units 54 and 53, provides the highest level of security. FIG. 17B shows a cross section of the FIG. 17A embodiment.

The at least one buffer zone 350 can be used, for example, with benefit in either or both of the floorplan or integrated circuit layout of a microchip 90 (and/or 501 and/or 1500, 1501, 1502, or 1503), but the buffer zone 350 provides a particularly significant security enhancement particularly when used in the physical design of a microchip 90 (and/or 501 and/or 1500, 1501, 1502, or 1503). One or more buffer zones 350 can be configured to provide a sufficient vacant space between the integrated circuits of the Public Unit 54 and the access barrier/firewall 50 (including the 50a, 50b, or 50c examples) to ensure that no "backdoor" connections exist between any portions of the Public Unit 54 and the Private Unit 53, or between any two portions of the microchip 90 (and/or 501 and/or 1500, 1501, 1502, or 1503) that are separated by an access barrier/firewall 50). The one or more buffer zones 350 can also be used in the same or similar manner in the motherboard of a computer.

Besides the absence of integrated circuitry, the one or more buffer zones 350 can usefully be configured in three dimensions so that, somewhat like a moat or an indentation, it can interrupt multiple layers of the microchip process used in making the microchip 90 (and/or 501 and/or 1500, 1501, 1502, or 1503), including 3D designs, so that there are no backdoor connections between the Public Unit 54 and the access barrier/firewall 50 (or any other units separated by an access barrier/firewall 50); a continuous boundary completely separating all microchip process layers between two units, such as the Units 54 and 53, provides the highest level of security.

The one or more buffer zones 350 can be of any number or configured in any size or shape or space necessary or useful to facilitate their function or that provides a security benefit. One or more of the buffer zones 350 can be usefully located at or near the same location as a part or all of one or more Faraday Cages 300 or Faraday Cage partitions 301, including for example fitting part or all of a boundary edge of a Faraday Cage 300 or partition 301 into a three dimensional moat-like or indented structure of the one or more buffer zones 350.

The one or more buffer zones 350 can also be configured to protect a part or all of one or more secure control buses 48, such as in the Public Unit 54 as shown in the FIG. 17A example embodiment.

The one or more buffer zones 350 can be particularly useful prior to microchip packaging (or computer assembly), so that it can be visually inspected, including by microscopic scanning or other device for manual or automated (including digital) comparison to an approved template, physical or digitized, including by xray or any other useful electromagnetic wavelength. The one or more buffer zones 350 can also be configured to include, for example, a non-conductive marker material in the form of a layer that outlines the boundary of the buffer zone, for example, to enhance the accuracy and speed of a scanning validation process to ensure compliance with an approved template and to mark the microchip for ease of alignment with the template.

The width of the buffer zone 350 can be configured to be any useful width, including to provide electromagnetic radiation buffering against interference or surveillance where a Faraday Cage 300 or partition 301 are not used; the width can be, for example, at least the size of process used in making the microchip 90 (and/or 501 and/or 1500, 1501, 1502, or 1503), such as current examples like 180, 130, 90, 65, 32, or 22 nanometer processes, or multiples of any of those processes, such as at least 360 nm, 480 nm, or 720 nm, for example.

The buffer zone 350 can also be positioned between, for example, the access barrier/firewall 50 and the Private Unit 53, and it can be incorporated into the access barrier/firewall 50.

Figure 17:
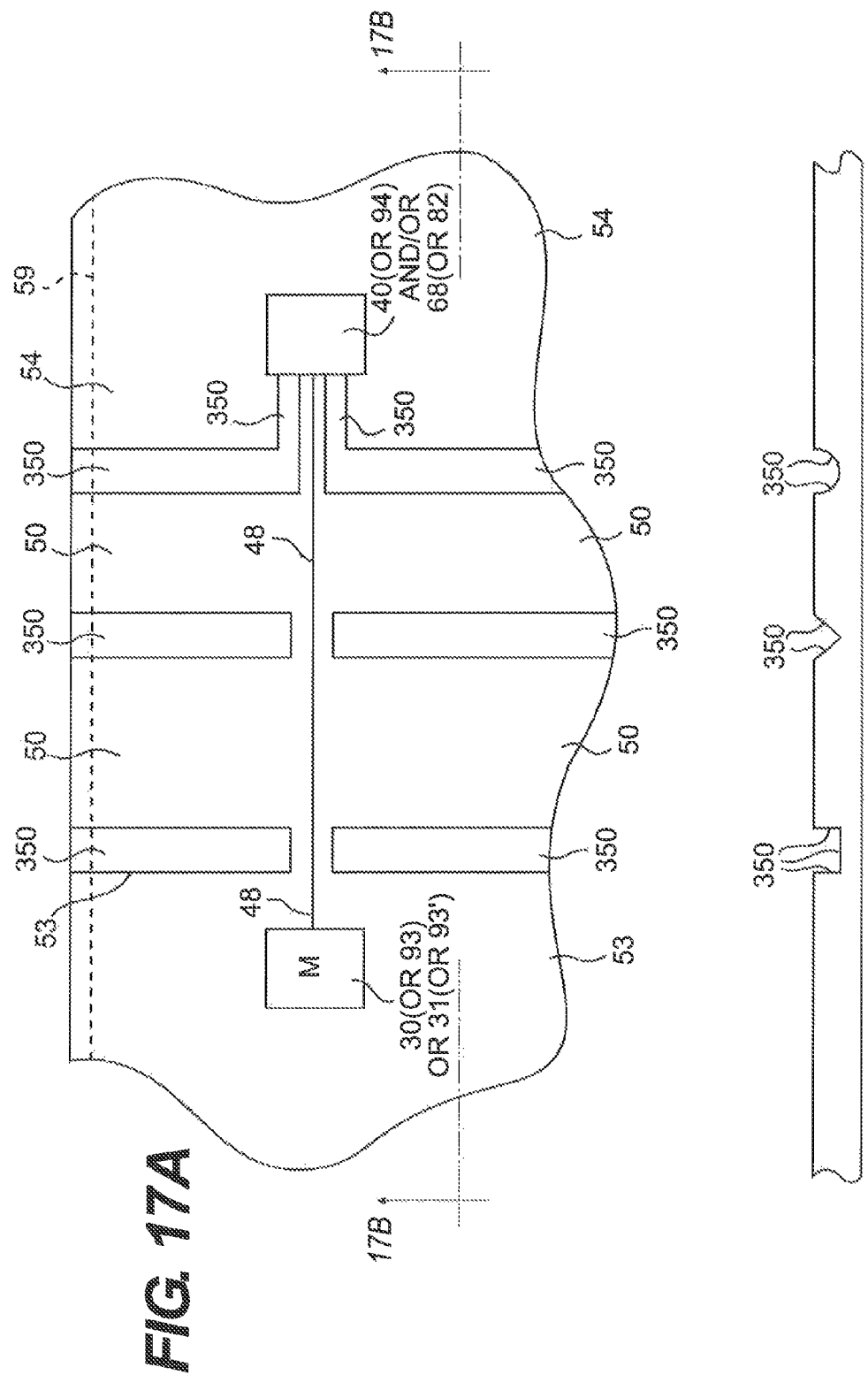
FIG. 17A shows a buffer zone 350 without circuitry in any process layer in the zone, which functions to prevent hidden backdoor connections between microchip (or computer) units separated by an access barrier/firewall 50, such as between a Private Unit 53 and a Public Unit 54.
FIG. 17B shows a cross section of the FIG. 17A embodiment.

More than one buffer zone 350 can be used between any two units in any configuration, as shown in the FIG. 17 example, which shows also one access barrier/firewall 50 with an integrated buffer zone 350 in its central portion.

The one or more buffer zones 350 can be configured to allow planned and/or authorized buses such as 55, 56, and/or 55/56, and/or one or more secure control buses 48, for example.

Finally, FIG. 17 shows the potential use anywhere in computers 1 and/or microchips 90 and/or 1500, 1501, 1502, or 1503 of a field programmable gate array or arrays (FPGA) 59 or (other means of active hardware configuration), as described under FIG. 1.

FIG. 18 is like FIG. 6, but shows an example embodiment with the central controller (C) positioned in Private Unit 53[1] and a secondary controller (S) 32 in Private Unit 53[2], temporarily or permanently.

Figure 19:
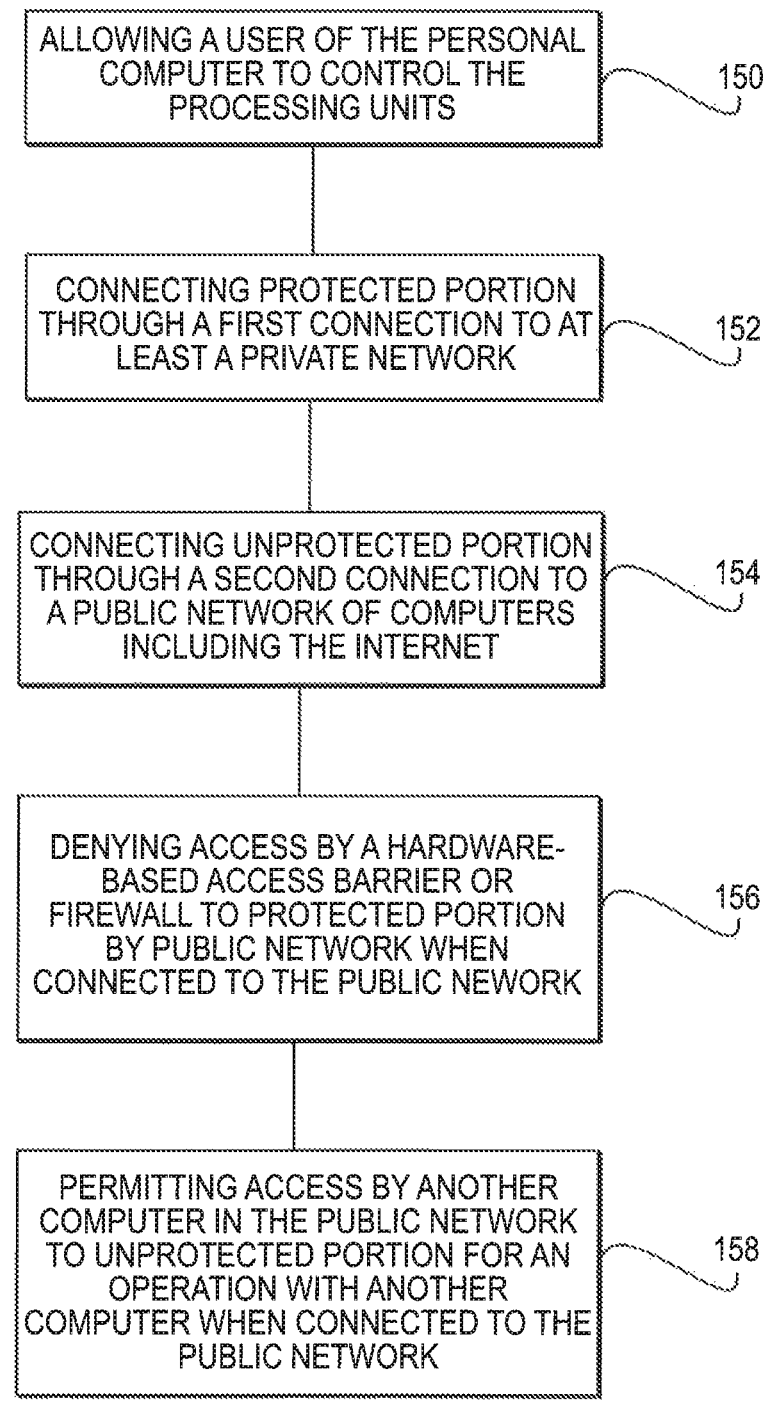
FIGS. 19 and 20 illustrate methods in accordance with the present disclosure.

In accordance with the present disclosure, a method of protecting a computer is disclosed in FIG. 19. The computer includes a master controlling device that is configured using hardware and firmware; at least two general purpose microprocessors; a protected portion of the computer; an unprotected portion of the computer; and an inner hardware-based access barrier or firewall that is located between the protected portion of the computer and the unprotected portion of the computer, the protected portion including at least the master controlling device and at least one of the microprocessors, and the unprotected portion including at least one of the microprocessors, the at least one microprocessor of the unprotected portion being separate from and located outside of the inner hardware-based access barrier or firewall. As shown in FIG. 19, the method includes allowing a user of the computer to control the microprocessors (150); connecting the protected portion of the computer through a first connection to at least a private network of computers (152); connecting the unprotected portion of the computer through a second connection to a public network of computers including the Internet (154); denying access by the hardware-based access barrier or firewall to the protected portion of the computer by the public network when the personal computer is connected to the public network (156); and permitting access by any other computer in the public network to the one or more of the processing units included in the unprotected portion of the computer for an operation with the any other computer in the public network when the personal computer is connected to the public network (158).

Figure 20:
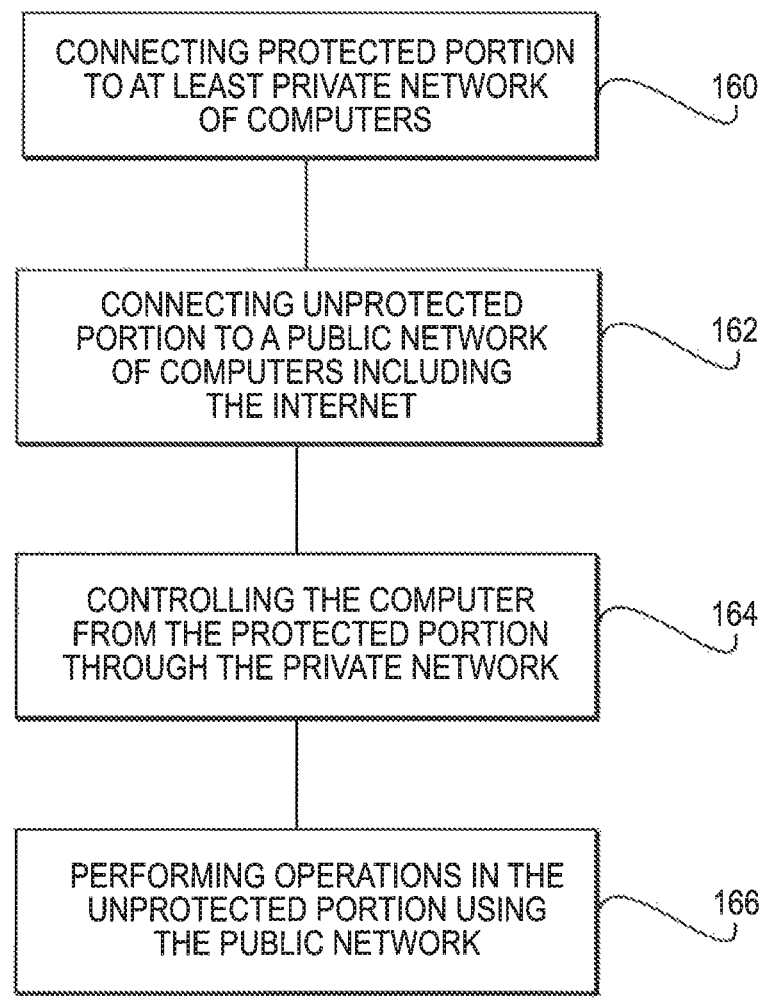

In accordance with the present disclosure, a method of protecting a computer disclosed in FIG. 20. The computer includes a master controlling device that is configured using hardware and firmware; at least two general purpose microprocessors; a protected portion of the computer; an unprotected portion of the computer; and an inner hardware-based access barrier or firewall that is located between the protected portion of the computer and the unprotected portion of the computer, the protected portion including at least the master controlling device and at least one of the microprocessors, and the unprotected portion including at least one of the microprocessors, the at least one microprocessor of the unprotected portion being separate from and located outside of the inner hardware-based access barrier or firewall. As shown in FIG. 20, the method includes connecting the protected portion of the computer through at least a first connection to at least a private network of computers (160); connecting the unprotected portion of the computer through a second connection to an public network of computers including the Internet (162); controlling the computer from the protected portion through the private network (164); and performing operations in the unprotected portion using the public network (166).

Any one or more features or components of FIGS. 1-20 of this application can be usefully combined with one or more features or components of FIGS. 1-31 of the above '657 U.S. Application or FIGS. 1-27 of the above '769 U.S. Application. Each of the above '657 and '769 Applications and their associated U.S. publications are expressly incorporated by reference in its entirety for completeness of disclosure of the applicant's combination of one or more features or components of either of those above two prior applications of this applicant with one or more features or components of this application. All such useful possible combinations are hereby expressly intended by this applicant.

Furthermore, any one or more features or components of FIGS. 1-20 of this application can be usefully combined with one or more features or components of the figures of the above '049 and '553 U.S. Applications, as well as in the above '428, '250, '141, '449, '906, '275, '020, '854, '529, '756, and '233 U.S. patents. Each of the above '049 and '553 Applications and their associated U.S. publications, as well as the above '428, '250, '141, '449, '906, '275, '020, '854, '529, '756, and '233 U.S. patents are expressly incorporated by reference in its entirety for completeness of disclosure of the applicant's combination of one or more features or components of either of those above two prior applications of this applicant with one or more features or components of this application. All such useful possible combinations are hereby expressly intended by this applicant.

In addition, one or more features or components of any one of FIGS. 1-20 or associated textual specification of this application can be usefully combined with one or more features or components of any one or more other of FIGS. 1-20 or associated textual specification of this application. And any such combination derived from the figures or associated text of this application can also be combined with any feature or component of the figures or associated text of any of the above incorporated by reference U.S. Applications '657, '769, '049, and '553, as well as U.S. Patents Numbers '428, '250, '141, '449, '906, '275, '020, '854, '529, '756, and '233.

The invention claimed is:

1. A method of securely controlling computer, including a computer on a microchip, said computer being configured to operate as a general purpose computer connected to the Internet, said computer comprising:

at least one network connection configured for connection to at least a public network of computers including the Internet, said at least one network connection being located in at least one public unit of said computer, at least one additional and separate private network connection configured for connection to at least a separate, private network of computers, said at least one additional and separate private network connection being located in at least one protected private unit of said computer, and at least one inner hardware-based access barrier or inner hardware-based firewall that is located between and communicatively connects said at least one protected private unit of said computer and said at least one public unit of said computer;

wherein said private and public units and said two separate network connections are separated by said at least one inner hardware-based access barrier or inner hardware-based firewall;

said at least one protected private unit of the computer includes at least a first microprocessor or core or processing unit, said at least one public unit of the computer includes at least a second microprocessor or core or processing unit, configured to operate as a general purpose microprocessor or core or processing unit, and said second microprocessor or core or processing unit is separate from said inner hardware-based access barrier or inner hardware-based firewall; and at least a part of said computer is configured using active hardware configuration; and said method comprising the steps of:

controlling at least a part of said active hardware configuration of said computer from said private network of computers, said controlling step including at least transmitting data and/or code from said private network of computers to said separate private network connection in said protected private unit of said computer;

receiving said data and/or code by said first microprocessor or core or processing unit in said protected private unit of said computer; and transmitting data and/or code by said first microprocessor or core or processing unit in said protected private unit to at least a part of said computer to configure at least a part of said computer using said active hardware configuration of said computer.

2. The method of claim 1, wherein said computer further comprises at least one microchip that is configurable using at least one field programmable gate array (FPGA); and said method further comprising the steps of:

controlling at least a part of FPGA configuration of said FPGA configurable microchip from said private network of computers, said controlling step including at least transmitting data and/or code from said private network of computers to said separate private network connection in said protected private unit of said computer;

receiving said data and/or code by said first microprocessor or core or processing unit in said protected private unit of said computer; and transmitting data and/or code by said first microprocessor or core or processing unit in said protected private unit to at least a part of said FPGA configurable microchip to configure at least a part of said microchip using said at least one FPGA.

3. The method of claim 2, wherein said FPGA configurable microchip further comprises:

at least a separate, second inner hardware-based access barrier or inner hardware-based firewall that protects at least a separate, second private network connection configured for connection to at least a separate, second private network of computers, said at least a second private network connection being located in at least a second protected private unit of said FPGA configurable microchip; and said second protected private unit of the FPGA configurable microchip includes at least a third microprocessor or core or processing unit; and said method further comprising the steps of:

controlling at least a part of said FPGA configuration of said FPGA configurable microchip from said second private network of computers, said controlling step including at least transmitting data and/or code from said second private network of computers to said second private network connection in said second protected private unit of said FPGA configurable microchip; and receiving said data and/or code in at least a part of said second protected private unit of said FPGA configurable microchip from said second private network of computers, said part of said second protected private unit including at least said third microprocessor or core or processing unit; and transmitting data and/or code by said third microprocessor or core or processing unit to at least a part of said FPGA configurable microchip to configure at least a part of said FPGA configurable microchip using said at least one FPGA.

4. The method of claim 3, wherein said FPGA configurable microchip further comprises:

at least a separate, third inner hardware-based access barrier or inner hardware-based firewall that protects at least a separate, third private network connection configured for connection to at least a separate, third private network of computers, said at least a third private network connection being located in at least a third protected private unit of said FPGA configurable microchip; and said third protected private unit of the FPGA configurable microchip includes at least a fourth microprocessor or core or processing unit; and said method further comprising the steps of:

controlling at least a part of said FPGA configuration of said FPGA configurable microchip from said third private network of computers, said controlling step including at least transmitting data and/or code from said third private network of computers to said third private network connection in said third protected private unit of said FPGA configurable microchip; and receiving said data and/or code in at least a part of said third protected private unit of said FPGA configurable microchip from said third private network of computers, said part of said third protected private unit including at least said fourth microprocessor or core or processing unit; and transmitting data and/or code by said fourth microprocessor or core or processing unit to at least a part of said FPGA configurable microchip to configure at least a part of said FPGA configurable microchip using said at least one FPGA.

5. The method of claim 2, wherein:

said inner hardware-based access barrier or inner hardware-based firewall is configured in a manner such that the at least one protected private unit and the at least one public unit are connected by at least one out-only bus or channel that transmits data and/or code that is output from the at least one protected private unit to be input to the at least one public unit; and said method further comprises the step of:
transmitting data and/or code by said first microprocessor or core or processing unit in said protected private unit through said out-only bus or channel to at least a part of said public unit to configure at least a part of said computer using said active hardware configuration of said computer.

6. The method of claim 5, wherein:
said inner hardware-based access barrier or inner hardware-based firewall is configured in a manner such that the at least one protected private unit and the at least one public unit are also connected by at least one in-only bus or channel that includes a hardware input on/off switch; and said method further comprising the step of:
receiving data and/or code from said public unit part through said in-only bus or channel at said first microprocessor or core or processing unit.

7. The method of claim 1, wherein said computer further comprises:
at least a separate, second inner hardware-based access barrier or inner hardware-based firewall that protects at least a separate, second private network connection configured for connection to at least a separate, second private network of computers, said at least a second private network connection being located in at least a second protected private unit of said computer; and
said second protected private unit of the computer includes at least a third microprocessor or core or processing unit; and said method further comprising the steps of:
controlling at least a part of said active hardware configuration of said computer from said second private network of computers, said controlling step including at least transmitting data and/or code from said second private network of computers to said second private network connection in said second protected private unit of said computer; and
receiving said data and/or code in at least a part of said second protected private unit of said computer from said second private network of computers, said part of said second protected private unit including at least said third microprocessor or core or processing unit; and
transmitting data and/or code by said third microprocessor or core or processing unit to at least a part of said computer to configure at least a part of said computer using said active hardware configuration of said computer.

8. The method of claim 7, wherein said computer further comprises:
at least a separate, third inner hardware-based access barrier or inner hardware-based firewall that protects at least a separate, third private network connection configured for connection to at least a separate, third private network of computers, said at least a third private network connection being located in at least a third protected private unit of said computer; and
said third protected private unit of the computer includes at least a fourth microprocessor or core or processing unit; and said method further comprising the steps of:
controlling at least a part of said active hardware configuration of said computer from said third private network of computers, said controlling step including at least transmitting data and/or code from said third private network of computers to said third private network connection in said third protected private unit of said computer; and
receiving said data and/or code in at least a part of said third protected private unit of said computer from said third private network of computers, said part of said third protected private unit including at least said fourth microprocessor or core or processing unit; and
transmitting data and/or code by said fourth microprocessor or core or processing unit to at least a part of said computer to configure at least a part of said computer using said active hardware configuration of said computer.

9. The method of claim 1, wherein:
said inner hardware-based access barrier or inner hardware-based firewall is configured in a manner such that the at least one protected private unit and the at least one public unit are connected by at least one out-only bus or channel that transmits data and/or code that is output from the at least one protected private unit to be input to the at least one public unit; and said method further comprising the step of:
transmitting data and/or code by said first microprocessor or core or processing unit in said protected private unit through said out-only bus or channel to at least a part of said public unit to configure at least a part of said computer using said active hardware configuration of said computer.

10. The method of claim 9, wherein:
said inner hardware-based access barrier or inner hardware-based firewall is configured in a manner such that the at least one protected private unit and the at least one public unit are also connected by at least one in-only bus or channel that includes a hardware input on/off switch; and said method further comprising the step of:
receiving data and/or code from said public unit part through said in-only bus or channel at said first microprocessor or core or processing unit.

11. The method of claim 1, wherein said computer further comprises:
at least a separate, second inner hardware-based access barrier or inner hardware-based firewall that protects at least a second protected private unit of said computer;
said second protected private unit of the computer includes at least a master controlling device or central controller of said computer; and said method further comprising the step of:
controlling by said master controlling device or central controller on a peremptory basis one or more parts of said computer, said master controlling device or central controller being controlled by a user of said computer.

12. The method of claim 11, wherein said method further comprises the step of:
controlling by said master controlling device or central controller on a peremptory basis all parts of said computer, said master controlling device or central controller being controlled by a user of said computer.

13. The method of claim 11, wherein said wherein said controlling step controls on a peremptory basis said one or more parts of said computer using a secure control bus.

14. The method of claim 1, wherein said computer includes at least 2 or 3 or 4 or 6 or 8 or 16 or 32 or 64 or 128 or 256 or 512 or 1024 microprocessors located in the public unit, each said microprocessor protected by a separate hardware-based inner access barrier or inner firewall.

15. A method of securely controlling a computer, including a computer on a microchip, said computer being configured for connection to the Internet, said computer comprising:
- at least one network connection configured for connection to at least a public network of computers including the Internet, said at least one network connection being located in at least one public unit of said computer,
- at least one additional and separate private network connection configured for connection to at least a separate, private network of computers, said at least one additional and separate private network connection being located in at least one protected private unit of said computer, and
- at least one inner hardware-based access barrier or inner hardware-based firewall that is located between and communicatively connects said at least one protected private unit of said computer and said at least one public unit of said computer;
  - wherein said private and public units and said two separate network connections are separated by said at least one inner hardware-based access barrier or inner hardware-based firewall;
  - said at least one protected private unit of the computer includes at least a first microprocessor or core or processing unit,
  - said at least one public unit of the computer includes at least a second microprocessor or core or processing unit; and
  - said second microprocessor or core or processing unit is separate from said inner hardware-based access barrier or inner hardware-based firewall; and
- at least a part of said computer is configured using active hardware configuration; and said method comprising the steps of:
- controlling at least a part of said active hardware configuration of said computer from said private network of computers, said controlling step including at least transmitting data and/or code from said private network of computers to said separate private network connection in said protected private unit of said computer;
- receiving said data and/or code by said first microprocessor or core or processing unit in said protected private unit of said computer; and
- transmitting data and/or code by said first microprocessor or core or processing unit in said protected private unit to at least a part of said computer to configure at least a part of said computer using said active hardware configuration of said computer.

16. The method of claim 15, wherein said computer further comprises at least one microchip that is configurable using at least one field programmable gate array (FPGA); and said method further comprising the steps of:
- controlling at least a part of FPGA configuration of said FPGA configurable microchip from said private network of computers, said controlling step including at least transmitting data and/or code from said private network of computers to said separate private network connection in said protected private unit of said computer;
- receiving said data and/or code by said first microprocessor or core or processing unit in said protected private unit of said computer; and
- transmitting data and/or code by said first microprocessor or core or processing unit in said protected private unit to at least a part of said FPGA configurable microchip to configure at least a part of said FPGA configurable microchip using said at least one FPGA.

17. The method of claim 16, wherein said FPGA configurable microchip further comprises:
- at least a separate, second inner hardware-based access barrier or inner hardware-based firewall that protects at least a separate, second private network connection configured for connection to at least a separate, second private network of computers, said at least a second private network connection being located in at least a second protected private unit of said FPGA configurable microchip;
  - said second protected private unit of the FPGA configurable microchip includes at least a third microprocessor or core or processing unit; and
- said method further comprising the steps of:
  - controlling at least a part of said FPGA configuration of said FPGA configurable microchip from said second private network of computers, said controlling step including at least transmitting data and/or code from said second private network of computers to said second private network connection in said second protected private unit of said FPGA configurable microchip; and
  - receiving said data and/or code in at least a part of said second protected private unit of said FPGA configurable microchip from said second private network of computers, said part of said second protected private unit including at least said third microprocessor or core or processing unit; and
  - transmitting data and/or code by said third microprocessor or core or processing unit to at least a part of said FPGA configurable microchip to configure at least a part of said FPGA configurable microchip using said at least one FPGA.

18. The method of claim 16, wherein said FPGA configurable microchip further comprises:
- at least a separate, third inner hardware-based access barrier or inner hardware-based firewall that protects at least a separate, third private network connection configured for connection to at least a separate, third private network of computers, said at least a third private network connection being located in at least a third protected private unit of said FPGA configurable microchip;
  - said third protected private unit of the FPGA configurable microchip includes at least a fourth microprocessor or core or processing unit; and
- said method further comprising the steps of:
  - controlling at least a part of said FPGA configuration of said FPGA configurable microchip from said third private network of computers, said controlling step including at least transmitting data and/or code from said third private network of computers to said third private network connection in said third protected private unit of said FPGA configurable microchip; and
  - receiving said data and/or code in at least a part of said third protected private unit of said FPGA configurable microchip from said third private network of computers, said part of said third protected private unit including at least said fourth microprocessor or core or processing unit; and
  - transmitting data and/or code by said fourth microprocessor or core or processing unit to at least a part of said FPGA configurable microchip to configure at least a part of said FPGA configurable microchip using said at least one FPGA.

19. The method of claim 16:
   said inner hardware-based access barrier or inner hardware-based firewall is configured in a manner such that the at least one protected private unit and the at least one public unit are connected by at least one out-only bus or channel that transmits data and/or code that is output from the at least one protected private unit to be input to the at least one public unit; and
said method further comprising the step of:
   transmitting data and/or code by said first microprocessor or core or processing unit in said protected private unit through said out-only bus or channel to at least a part of said public unit to configure at least a part of said computer using said active hardware configuration of said computer.

20. The method of claim 19:
   said inner hardware-based access barrier or inner hardware-based firewall is configured in a manner such that the at least one protected private unit and the at least one public unit are also connected by at least one in-only bus or channel that includes a hardware input on/off switch; and
said method further comprising the step of:
   receiving data and/or code from said public unit part through said in-only bus or channel to at said first microprocessor or core or processing unit.

21. The method of claim 15, wherein said computer further comprises:
   at least a separate, second inner hardware-based access barrier or inner hardware-based firewall that protects at least a separate, second private network connection configured for connection to at least a separate, second private network of computers, said at least a second private network connection being located in at least a second protected private unit of said computer; and
   said second protected private unit of the computer includes at least a third microprocessor or core or processing unit; and
said method further comprising the steps of:
   controlling at least a part of said active hardware configuration of said computer from said second private network of computers, said controlling step including at least transmitting data and/or code from said second private network of computers to said second private network connection in said second protected private unit of said computer; and
   receiving said data and/or code in at least a part of said second protected private unit of said computer from said second private network of computers, said part of said second protected private unit including at least said third microprocessor or core or processing unit; and
   transmitting data and/or code by said third microprocessor or core or processing unit to at least a part of said computer to configure at least a part of said computer using said active hardware configuration of said computer.

22. The method of claim 15, wherein said computer further comprises:
   at least a separate, third inner hardware-based access barrier or inner hardware-based firewall that protects at least a separate, third private network connection configured for connection to at least a separate, third private network of computers, said at least a third private network connection being located in at least a third protected private unit of said computer;
   said third protected private unit of the computer includes at least a fourth microprocessor or core or processing unit, said method further comprising the steps of:
   controlling at least a part of said active hardware configuration of said computer from said third private network of computers, said controlling step including at least transmitting data and/or code from said third private network of computers to said third private network connection in said third protected private unit of said computer; and
   receiving said data and/or code in at least a part of said third protected private unit of said computer from said third private network of computers, said part of said third protected private unit including at least said fourth microprocessor or core or processing unit; and
   transmitting data and/or code by said fourth microprocessor or core or processing unit to at least a part of said computer to configure at least a part of said computer using said active hardware configuration of said computer.

23. The method of claim 15, wherein:
   said inner hardware-based access barrier or inner hardware-based firewall is configured in a manner such that the at least one protected private unit and the at least one public unit are connected by at least one out-only bus or channel that transmits data and/or code that is output from the at least one protected private unit to be input to the at least one public unit; and
said method further comprising the step of:
   transmitting data and/or code by said first microprocessor or core or processing unit in said protected private unit through said out-only bus or channel to at least a part of said public unit to configure at least a part of said computer using said active hardware configuration of said computer.

24. The method of claim 23, wherein:
   said inner hardware-based access barrier or inner hardware-based firewall is configured in a manner such that the at least one protected private unit and the at least one public unit are also connected by at least one in-only bus or channel that includes a hardware input on/off switch; and
said method further comprises the step of:
   receiving data and/or code from said public unit part through said in-only bus or channel to at said first microprocessor or core or processing unit.

25. The method of claim 15, wherein said computer further comprises:
   at least a separate, second inner hardware-based access barrier or inner hardware-based firewall that protects at least a second protected private unit of said computer;
   said second protected private unit of the computer includes at least a master controlling device or central controller of said computer; and
said method further comprising the step of:
   controlling by said master controlling device or central controller on a peremptory basis one or more parts of said computer, said master controlling device or central controller being controlled by a user of said computer.

26. The method of claim 25, wherein said method further comprises the step of:
   controlling by said master controlling device or central controller on a peremptory basis all parts of said computer, said master controlling device or central controller being controlled by a user of said computer.

27. The method of claim 25, wherein said wherein said controlling step controls on a peremptory basis said one or more parts of said computer using a secure control bus.

28. The method of claim 15, wherein said computer includes at least 2 or 3 or 4 or 6 or 8 or 16 or 32 or 64 or 128 or 256 or 512 or 1024 microprocessors located in the public unit, each said microprocessor protected by a separate hardware-based inner access barrier or inner firewall.

29. A method of securely controlling a computer, including a computer on a microchip, said computer is configured to operate as a general purpose computer connected to the Internet, said computer comprising:
- at least one network connection configured for connection to at least a public network of computers including the Internet, said at least one network connection being located in at least one public unit of said computer,
- at least one additional and separate private network connection configured for connection to at least a separate, private network of computers, said at least one additional and separate private network connection being located in at least one protected private unit of said computer, and
- at least one inner hardware-based access barrier or inner hardware-based firewall that is located between and communicatively connects said at least one protected private unit of said computer and said at least one public unit of said computer;
  - wherein said private and public units and said two separate network connections are separated by said at least one inner hardware-based access barrier or inner hardware-based firewall;
  - said at least one protected private unit of the computer includes at least a first microprocessor or core or processing unit,
  - said at least one public unit of the computer includes at least a second microprocessor or core or processing unit, configured to operate as a general purpose microprocessor or core or processing unit;
  - said second microprocessor or core or processing unit is separate from said inner hardware-based access barrier or inner hardware-based firewall;
  - at least a separate, second inner hardware-based access barrier or inner hardware-based firewall that protects at least a second protected private unit of said computer;
  - said second protected private unit of the computer includes at least a master controlling device or central controller of said computer; and
- said method comprising the steps of:
  - controlling at least one operation of said computer from said private network of computers, said operation including at least transmitting data and/or code from said private network of computers to said separate private network connection in said protected private unit of said computer;
  - receiving said data and/or code by said first microprocessor or core or processing unit in said protected private unit of said computer;
  - transmitting data and/or code by said first microprocessor or core or processing unit in said protected private unit to at least a part of said public unit; and
  - controlling by said master controlling device or central controller on a peremptory basis one or more parts of said computer, said master controlling device or central controller being controlled by a user of said computer.

30. The method of claim 29, wherein said computer further is configured using at least active hardware configuration, and said method further comprising the step of:
- controlling by said master controlling device or central controller on a peremptory basis at least a part of said active hardware configuration of said computer.

31. The method of claim 29, wherein said computer further comprises at least one microchip that is configurable using at least one field programmable gate array (FPGA); and said method further comprising the step of:
- controlling by said master controlling device or central controller on a peremptory basis at least a part of said FPGA configurable microchip configured using at least one FPGA.

32. The method of claim 29, wherein said method further comprises the step of:
- controlling by said master controlling device or central controller on a peremptory basis all parts of said computer.

33. The method of claim 29, wherein said controlling step controls on a peremptory basis one or more parts of said computer using a secure control bus.

34. The method of claim 29, wherein said computer includes at least 2 or 3 or 4 or 6 or 8 or 16 or 32 or 64 or 128 or 256 or 512 or 1024 microprocessors located in the public unit, each said microprocessor protected by a separate hardware-based inner access barrier or inner firewall.

35. A method of securely controlling a computer, including a computer on a microchip, said computer is configured for connection to the Internet, said computer comprising:
- at least one network connection configured for connection to at least a public network of computers including the Internet, said at least one network connection being located in at least one public unit of said computer,
- at least one additional and separate private network connection configured for connection to at least a separate, private network of computers, said at least one additional and separate private network connection being located in at least one protected private unit of said computer, and
- at least one inner hardware-based access barrier or inner hardware-based firewall that is located between and communicatively connects said at least one protected private unit of said computer and said at least one public unit of said computer;
  - wherein said private and public units and said two separate network connections are separated by said at least one inner hardware-based access barrier or inner hardware-based firewall;
  - said at least one protected private unit of the computer includes at least a first microprocessor or core or processing unit,
  - said at least one public unit of the computer includes at least a second microprocessor or core or processing unit;
  - said second microprocessor or core or processing unit is separate from said inner hardware-based access barrier or inner hardware-based firewall;
  - at least a separate, second inner hardware-based access barrier or inner hardware-based firewall that protects at least a second protected private unit of said computer; and
  - said second protected private unit of the computer includes at least a master controlling device or central controller of said computer, and
- said method comprising the steps of:
  - controlling at least one operation of said computer from said private network of computers, said operation including at least transmitting data and/or code from said private network of computers to said separate private network connection in said protected private unit of said computer;

receiving said data and/or code by said first microprocessor or core or processing unit in said protected private unit of said computer;

transmitting data and/or code by said first microprocessor or core or processing unit in said protected private unit to at least a part of said public unit; and controlling by said master controlling device or central controller on a peremptory basis one or more parts of said computer, said master controlling device or central controller being controlled by a user of said computer.

36. The method of claim 35, wherein said computer further is configured using at least active hardware configuration, and said method further comprising the step of:

controlling by said master controlling device or central controller on a peremptory basis at least a part of said active hardware configuration of said computer.

37. The method of claim 35, wherein said computer further comprises at least one microchip that is configurable using at least one field programmable gate array (FPGA); and said method further comprising the step of:

controlling by said master controlling device or central controller on a peremptory basis at least a part of said FPGA configurable microchip configured using at least one FPGA.

38. The method of claim 35, wherein said method further comprises the step of:

controlling by said master controlling device or central controller on a peremptory basis all parts of said computer.

39. The method of claim 35, wherein said controlling step controls on a peremptory basis one or more parts of said computer using a secure control bus.

40. The method of claim 35, wherein said computer includes at least 2 or 3 or 4 or 6 or 8 or 16 or 32 or 64 or 128 or 256 or 512 or 1024 microprocessors located in the public unit, each said microprocessor protected by a separate hardware-based inner access barrier or inner firewall.

* * * * *